US012393431B2

(12) United States Patent
Venkataramudu et al.

(10) Patent No.: US 12,393,431 B2
(45) Date of Patent: Aug. 19, 2025

(54) DC-SCM UNDISCOVERABLE DEVICE CONFIGURATION SYSTEM

(71) Applicant: Dell Products L.P., Round Rock, TX (US)

(72) Inventors: Raghavendra Venkataramudu, Bangalore (IN); Vinod Parackal Saby, Bangalore (IN); Guru Prasad Yadav, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 18/538,678

(22) Filed: Dec. 13, 2023

(65) Prior Publication Data

US 2025/0199821 A1 Jun. 19, 2025

(51) Int. Cl.
*G06F 9/445* (2018.01)
(52) U.S. Cl.
CPC .................... *G06F 9/4451* (2013.01)
(58) Field of Classification Search
CPC ....... G06F 1/266; G06F 1/3215; G06F 9/4451
USPC .......................................................... 713/2
See application file for complete search history.

(56) References Cited

U.S. PATENT DOCUMENTS

| 11,934,661 | B1* | 3/2024 | Cudak | G06F 3/067 |
| 12,111,707 | B2* | 10/2024 | Smith | G06F 1/26 |
| 12,174,758 | B2* | 12/2024 | Tsai | G06F 13/1652 |
| 2024/0311482 | A1* | 9/2024 | Paulraj | G06F 21/85 |
| 2025/0130813 | A1* | 4/2025 | Venkataramudu | G06F 9/4403 |
| 2025/0133092 | A1* | 4/2025 | Parackal Saby | H04L 63/1416 |

* cited by examiner

*Primary Examiner* — Brian T Misiura
(74) *Attorney, Agent, or Firm* — Joseph Mencher

(57) ABSTRACT

A DC-SCM undiscoverable device configuration system includes a DC-MHS computing device with an operational system, a discoverable device, an undiscoverable device, and a DC-SCM device coupled to the operational system and the discoverable device. The DC-SCM device receives and store static undiscoverable device operation information for the undiscoverable device and, during initialization operations for the DC-MHS computing device, retrieves static discoverable device operational information for the discoverable device and the static undiscoverable device operation information and uses it to configure operation of the operational system. During runtime operations for the DC-MHS computing device, the DC-SCM device retrieves dynamic discoverable device operational information from the discoverable device and the static undiscoverable device operation information, and uses it to modify operation of the operational system.

20 Claims, 17 Drawing Sheets

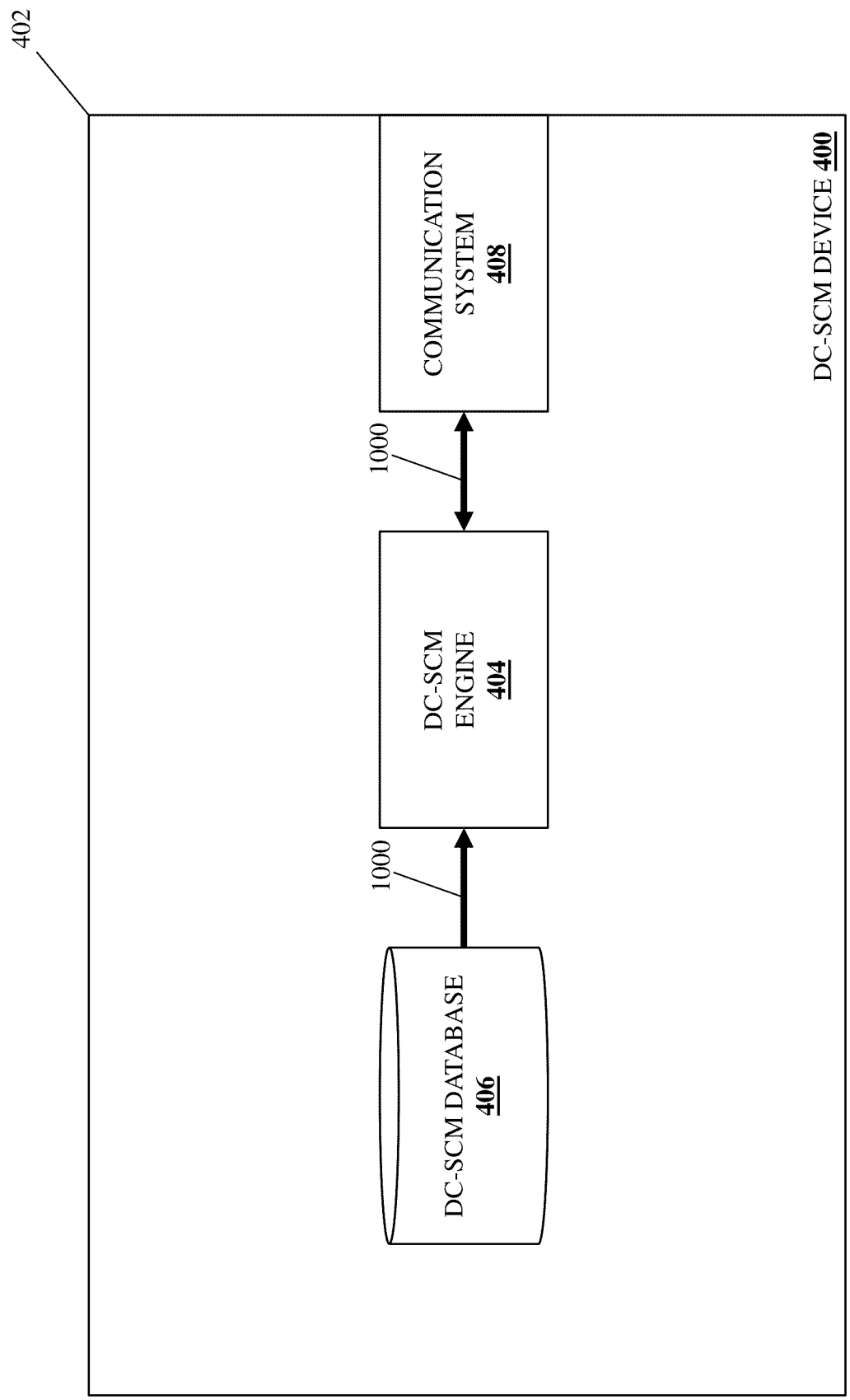

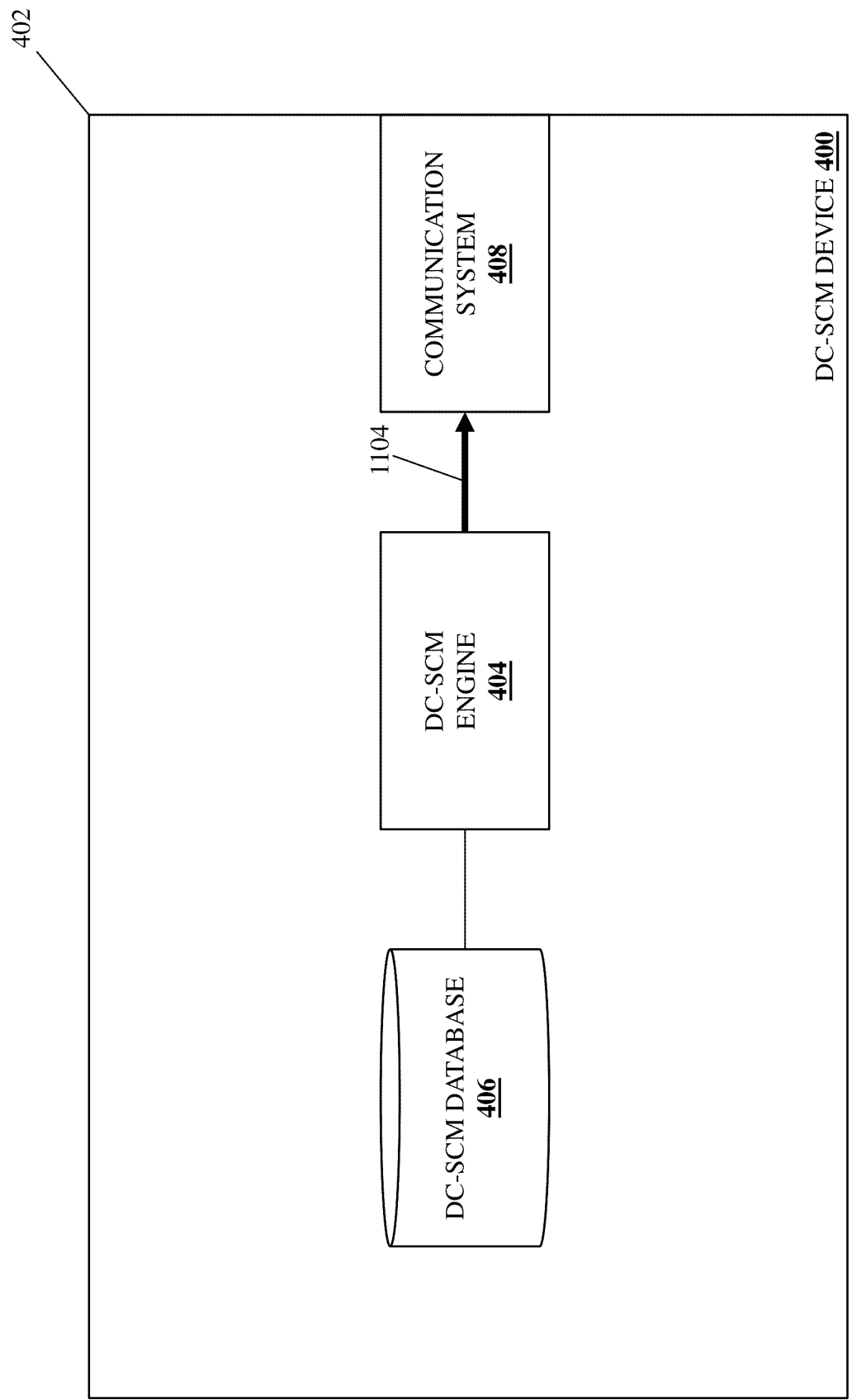

DC-SCM UNDISCOVERABLE DEVICE CONFIGURATION SYSTEM

BACKGROUND

The present disclosure relates generally to information handling systems, and more particularly to configuring a DC-SCM device to operate with undiscoverable devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and other computing devices known in the art may be provided in configurations promulgated by the Open Compute Project (OCP) according to the DataCenter Modular Hardware System (DC-MHS) sub-project (referred to as "DC-MHS" configurations below). As will be appreciated by one of skill in the art in possession of the present disclosure, the DC-MHS sub-project attempts to standardize a collection of Host Processor Module (HPM) form-factors and corresponding components (e.g., Add-In Cards (AICs)) to allow interoperability of those HPMs with computing devices and other platforms. Such DC-MHS configurations include a DataCenter Secure Control Module (DC-SCM) that performs Basic Input/Output System (BIOS) functionality to provide initialization and runtime operations for the DC-MHS computing device via the DC-SCM rather than via a conventional BIOS included on a conventional motherboard, Baseboard Management Controller (BMC) functionality to provide management and monitoring of hardware in the DC-MHS computing device rather than via a conventional BMC, and/or other DC-SCM functionality known in the art. However, the provisioning of DC-SCMs in DC-MHS computing devices can raise issues.

For example, conventional BIOS and BMCs are often configured by a computing device manufacturer to operate with hardware in the computing device that has been validated by the computing device manufacturer as being configured to operate with the BIOS and BMC. However, the modularity of DC-MHS computing devices allow DC-SCMs to be utilized with AICs provided by any of a variety of AIC manufacturers or vendors other than the DC-MHS computing device manufacturer, and presents the possibility of the DC-SCM being provided in a DC-MHS computing device with AICs that have not been not validated by the DC-SCM manufacturer and/or DC-MHS computing device manufacturer as being configured to operate with the DC-SCM. As such, AICs provided in a DC-MHS computing device may not be configured (e.g., with hardware interfaces, software protocols, etc.) to be discovered by the DC-SCM in that DC-MHS computing device and/or to otherwise enable BIOS and/or BMC functionality available from the DC-SCM, which can limit the ability of the DC-SCM to perform many desirable the BIOS and/or BMC operations for the DC-MHS computing device.

Accordingly, it would be desirable to provide a DC-SCM configuration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a DataCenter System Control Module (DC-SCM) engine that is configured to: receive and store static undiscoverable device operation information for an undiscoverable device that is included in the IHS with the processing system; retrieve, during initialization operations for the IHS, static discoverable device operational information for a discoverable device that is coupled to the processing system, and the static undiscoverable device operation information; configure, during the initialization operations for the IHS using the static discoverable device operational information and the static undiscoverable device operation information, operation of an operational system that is coupled to the processing system; retrieve, during runtime operations for the IHS, dynamic discoverable device operational information from the discoverable device, and the static undiscoverable device operation information; and modify, during the runtime operations for the IHS using the dynamic discoverable device operational information and the static undiscoverable device operation information, operation of the operational system.

BRIEF DESCRIPTION OF THE DRAWINGS

FIG. 10A is a schematic view illustrating an embodiment of the DC-SCM device of FIG. 4 operating during the method of FIG. 5.

FIG. 11C is a schematic view illustrating an embodiment of the DC-SCM device of FIG. 4 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
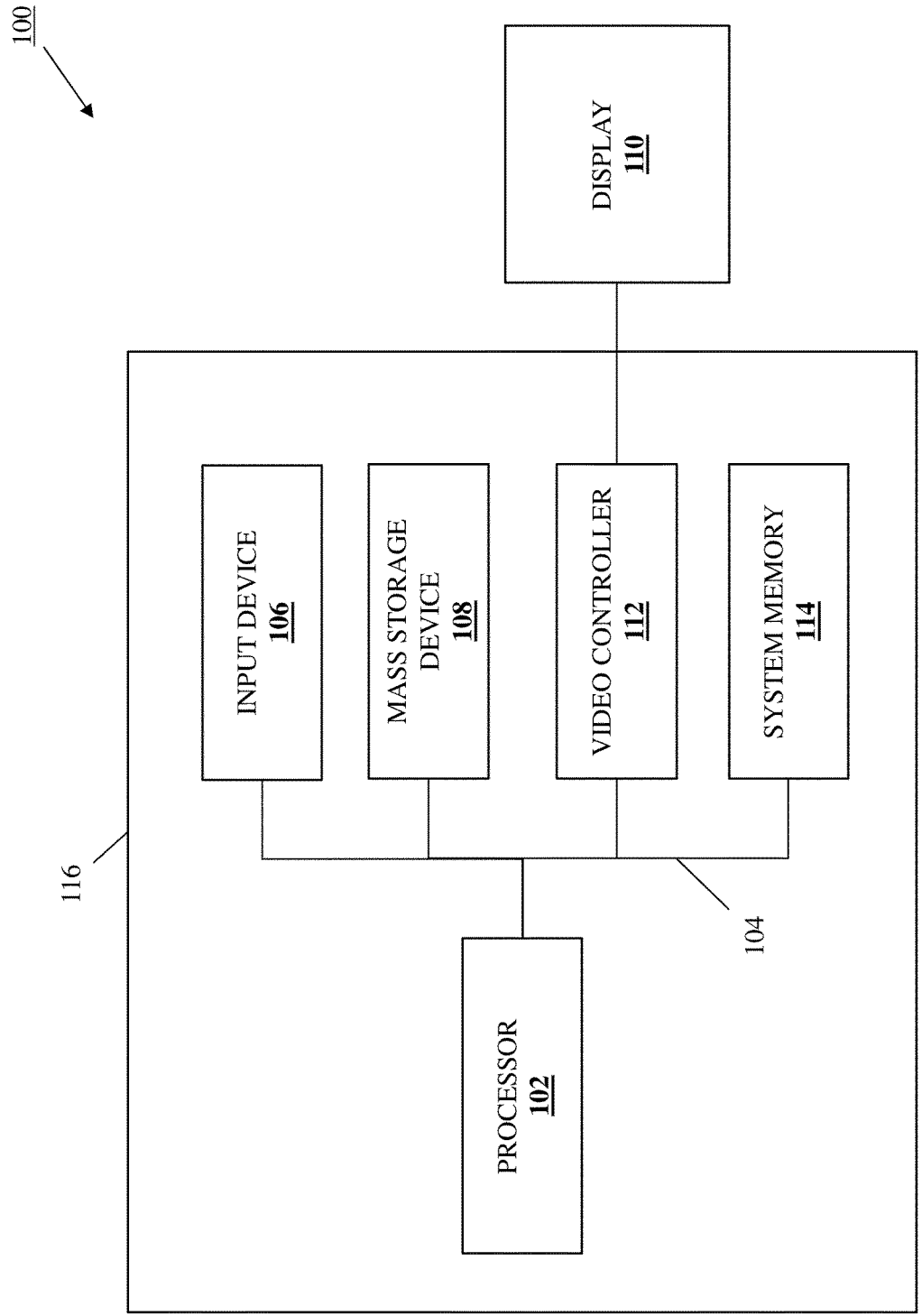
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
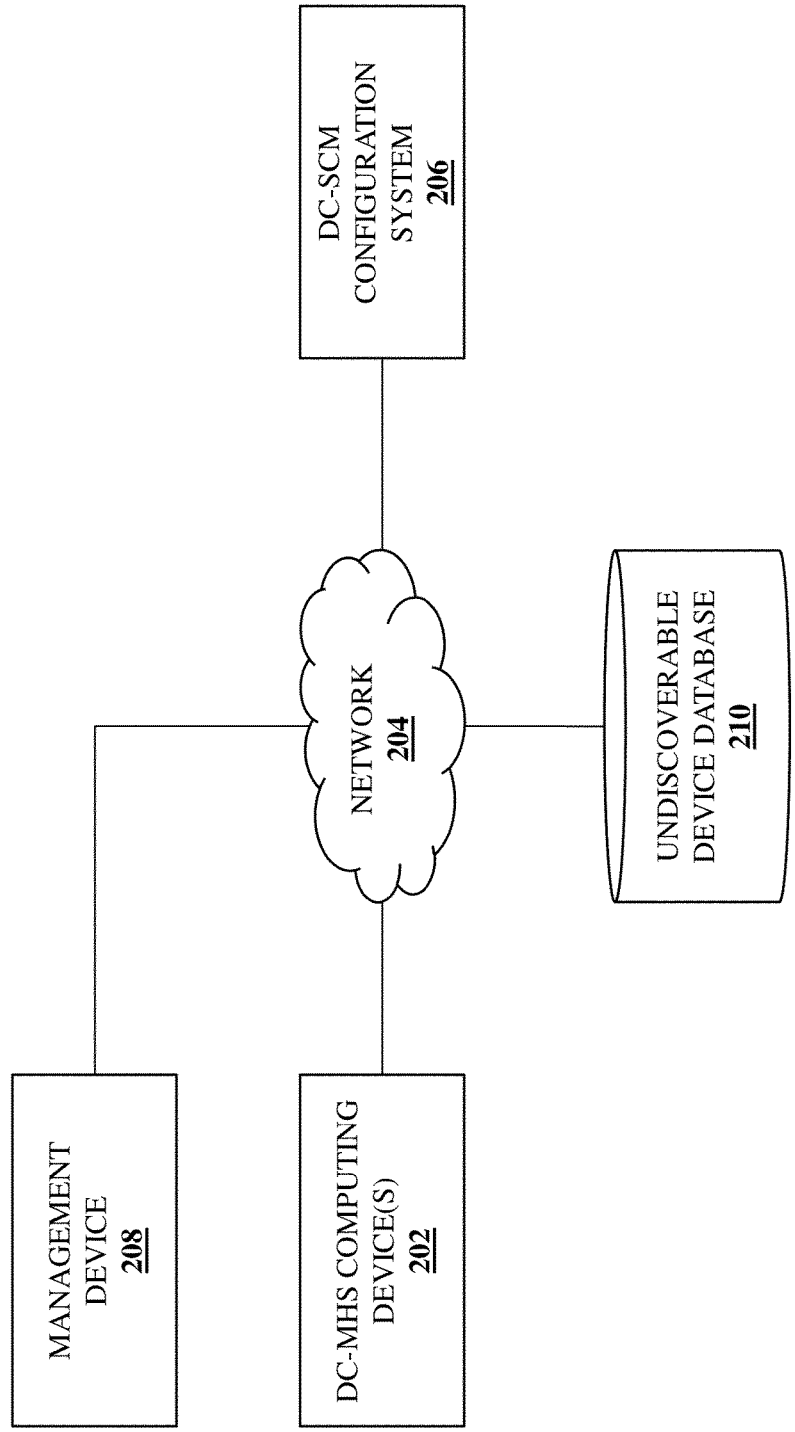
FIG. 2 is a schematic view illustrating an embodiment of a networked system that may provide the DC-SCM undiscoverable device configuration system of the present disclosure.

Referring now to FIG. 2, an embodiment of a networked system 200 is illustrated that may provide the DC-SCM undiscoverable device configuration system of the present disclosure. In the illustrated embodiment, the networked system 200 includes one or more DC-MHS computing devices 202 that, as discussed above, may be provided in configurations promulgated by the OCP according to the DC-MHS sub-project. In an embodiment, any or each of the DC-MHS computing device(s) 202 may be provided by the IHS 100 discussed above with reference to FIG. 1, and/or may include some or all of the components of the IHS 100, and in specific examples may be provided by server device(s). However, while illustrated and discussed as being provided by server devices, one of skill in the art in possession of the present disclosure will recognize that DC-MHS computing devices provided in the networked system 200 may include any computing devices that may be configured to operate similarly as the DC-MHS computing device(s) 202 discussed below.

In the illustrated embodiment, the DC-MHS computing device(s) 202 are coupled to a network 204 that may be provided by a Local Area Network (LAN), the Internet, combinations thereof, and/or any other network that would be apparent to one of skill in the art in possession of the present disclosure. Furthermore, a DC-SCM configuration system 206 is coupled via the network 204 to the DC-MHS computing device(s) 202. In an embodiment, the DC-SCM configuration system 206 may be provided by the IHS 100 discussed above with reference to FIG. 1, and/or may include some or all of the components of the IHS 100, and in specific examples may be provided by one or more server devices. However, while illustrated and discussed as being provided by server device(s), one of skill in the art in possession of the present disclosure will recognize that DC-SCM configuration systems provided in the networked system 200 may include any computing devices that may be configured to operate similarly as the DC-SCM configuration system 206 discussed below. In the examples below, the DC-SCM configuration system 206 is described as being provided by a DC-MHS computing device manufacturer of at least one of the DC-MHS computing device(s) 202, but one of skill in the art in possession of the present disclosure will appreciate how the DC-SCM configuration system 206 may be provided by other entities (e.g., a DC-SCM device manufacturer, etc.) while remaining within the scope of the present disclosure as well.

As illustrated, a management device 208 may be coupled to the network 204 in order to, for example, communicate with the DC-SCM configuration system 206 as described below. In an embodiment, the management device 208 may be provided by the IHS 100 discussed above with reference to FIG. 1, and/or may include some or all of the components of the IHS 100, and in specific examples may be provided by a desktop computing device, laptop/notebook computing device, table computing device, mobile phone, and/or other computing devices that would be apparent to one of skill in the art in possession of the present disclosure. However, while illustrated and discussed as being provided by particular computing devices, one of skill in the art in possession of the present disclosure will recognize that management devices provided in the networked system 200 may include any computing devices that may be configured to operate similarly as the management device 208 discussed below. In the examples below, the management device 208 is described as being utilized by a network administrator or other user of one of the DC-MHS computing device(s) 202, but one of skill in the art in possession of the present disclosure will appreciate how the management device 208 may be utilized by other entities while remaining within the scope of the present disclosure as well.

Furthermore, in some embodiments, a storage system (not illustrated, but which may be similar to the storage 108 discussed above with reference to FIG. 1) may be coupled to the network 204 and may include an undiscoverable device database 210 that is accessible to the DC-SCM configuration system 206 as described below. However, while illustrated and described as a network-accessible storage device/database, in some embodiments and as described below, the undiscoverable device database 210 may be included in the DC-SCM configuration system 206 while remaining within the scope of the present disclosure as well. Furthermore, while a specific networked system 200 has been illustrated and described, one of skill in the art in possession of the present disclosure will recognize that the networked system 200 of the present disclosure may include a variety of components and component configurations while remaining within the scope of the present disclosure as well.

Figure 3:
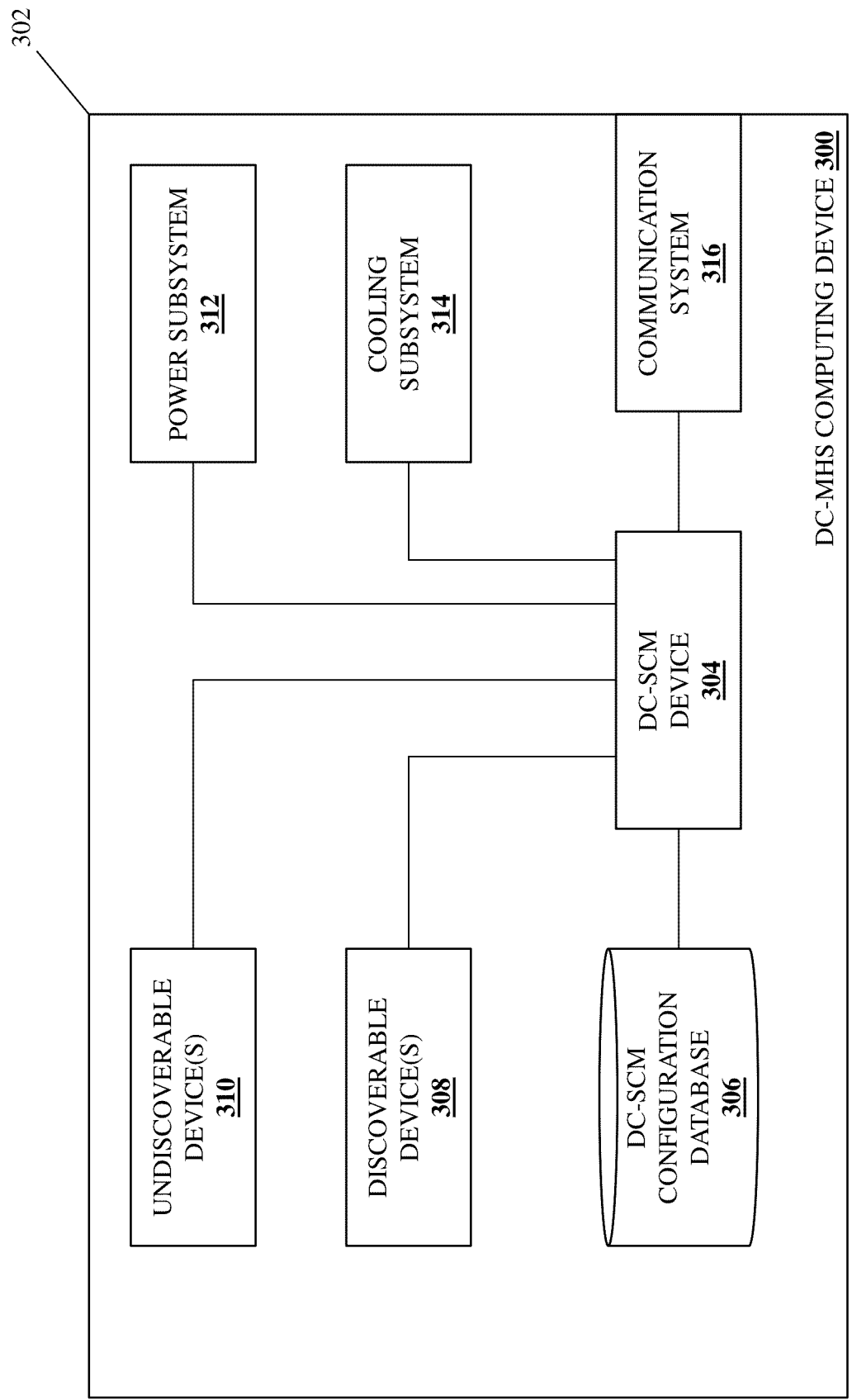
FIG. 3 is a schematic view illustrating an embodiment of a DC-MHS computing device that may provide the DC-SCM undiscoverable device configuration system of the present disclosure.

Referring now to FIG. 3, an embodiment of a DC-MHS computing device 300 is illustrated that may provide any of the DC-MHS computing device(s) 202 discussed above with reference to FIG. 2. As such, the DC-MHS computing device 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the DC-MHS computing device 300 discussed below may be provided by other devices that are configured to operate similarly as the DC-MHS computing device 300 discussed below.

In the illustrated embodiment, the DC-MHS computing device 300 includes a chassis 302 that houses the components of the DC-MHS computing device 300, only some of which are illustrated and described below. For example, the chassis 302 may house a DC-SCM device 304 that, as described above, may be configured to perform Basic Input/Output System (BIOS) functionality to provide initialization and runtime operations for the DC-MHS computing device 300 (e.g., rather than via a conventional BIOS included on a conventional motherboard), Baseboard Management Controller (BMC) functionality to provide management and monitoring of hardware in the DC-MHS computing device 300 (e.g., rather than via a conventional BMC), and/or other DC-SCM functionality known in the art.

The chassis 302 may also house a storage system (not illustrated, but which may be similar to the storage 108 discussed above with reference to FIG. 1, and which may be provided by a flash storage device included on a motherboard in the DC-MHS computing device 300 in some embodiments) that is coupled to the DC-SCM device 304 (e.g., via a coupling between the storage system and the DC-SCM device 304) and that includes a DC-SCM configuration database 306 that is configured to store any of the information utilized by the DC-SCM device 304 discussed below.

The chassis 302 may also house one or more discoverable devices 308 that are coupled to the DC-SCM device 304 and that may be provided by the Add-In Cards (AICs) described above that have been validated by a DC-SCM manufacturer of the DC-SCM device 304 and/or DC-MHS computing device manufacturer of the DC-MHS computing device 300 as being configured to operate with the DC-SCM device 304 and, as such, may be configured (e.g., with hardware interfaces, software protocols, etc.) to be discovered by the DC-SCM device 304 and/or to otherwise enable BIOS and/or BMC functionality available from the DC-SCM device 304. To provide some specific examples, the AICs providing the discoverable device(s) 308 may be configured to provide network card/controller functionality, and/or other AIC functionality that would be apparent to one of skill in the art in possession of the present disclosure.

The chassis 302 may also house one or more undiscoverable devices 310 that are coupled to the DC-SCM device 304 and that may be provided by the Add-In Cards (AICs) described above that have not been validated by a DC-SCM manufacturer of the DC-SCM device 304 and/or DC-MHS computing device manufacturer of the DC-MHS computing device 300 as being configured to operate with the DC-SCM device 304 and, as such, may not be configured (e.g., with hardware interfaces, software protocols, etc.) to be discovered by the DC-SCM device 304 and/or to otherwise enable BIOS and/or BMC functionality available from the DC-SCM device 304. To provide some specific examples, the AICs providing the undiscoverable device(s) 310 may be configured to provide network card/controller functionality, accelerator functionality, SmartNIC/DPU functionality, storage extender functionality, and/or other AIC functionality that would be apparent to one of skill in the art in possession of the present disclosure. However, while described as being provided by AICs, one of skill in the art in possession of the present disclosure will appreciate how the discoverable device(s) 308 and undiscoverable device(s) 310 may be provided by other computing components while remaining within the scope of the present disclosure as well.

The chassis 302 may also house an operational system that is coupled to the DC-SCM device 304 and that, in the embodiments illustrated and described below, may include a power subsystem 312 (e.g., a Power Supply Unit (PSU), power adapter, Power Distribution Unit (PDU), etc.) that is coupled to the DC-SCM device 304 and that is configured to provide power the discoverable device(s) 308, the undiscoverable device(s) 310, and/or any other powered components that one of skill in the art in possession of the present disclosure would recognize as being included in the DC-MHS computing device 300. In the embodiments illustrated and described below, the operational system in the chassis 302 may also include a cooling subsystem 314 (e.g., a fan system, fan devices, etc.) that is coupled to the DC-SCM device 304 and that is configured provide cooling to (e.g., to generate an airflow through the chassis 302 and past) the discoverable device(s) 308, the undiscoverable device(s)

310, and/or any other heat producing components that one of skill in the art in possession of the present disclosure would recognize as being included in the DC-MHS computing device 300. However, while two specific operational subsystems are illustrated and described, one of skill in the art in possession of the present disclosure will appreciate how the operational system in the DC-MHS computing device 300 may include any of a variety of operational subsystems while remaining within the scope of the present disclosure as well.

The chassis 302 may also house a communication system 316 that is coupled to the DC-SCM device 304 and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while illustrated as being separate from the DC-SCM device 304, one of skill in the art in possession of the present disclosure will appreciate how the communication system 316 described below may be provided in the DC-SCM device 304 while remaining within the scope of the present disclosure as well. Furthermore, while a specific DC-MHS computing device 300 has been illustrated and described, one of skill in the art in possession of the present disclosure will recognize that DC-MHS computing devices (or other computing devices operating according to the teachings of the present disclosure in a manner similar to that described below for the DC-MHS device 300) may include a variety of components and/or component configurations for providing conventional DC-MHS device functionality, as well as the DC-SCM undiscoverable device configuration functionality discussed below, while remaining within the scope of the present disclosure as well.

Figure 4:
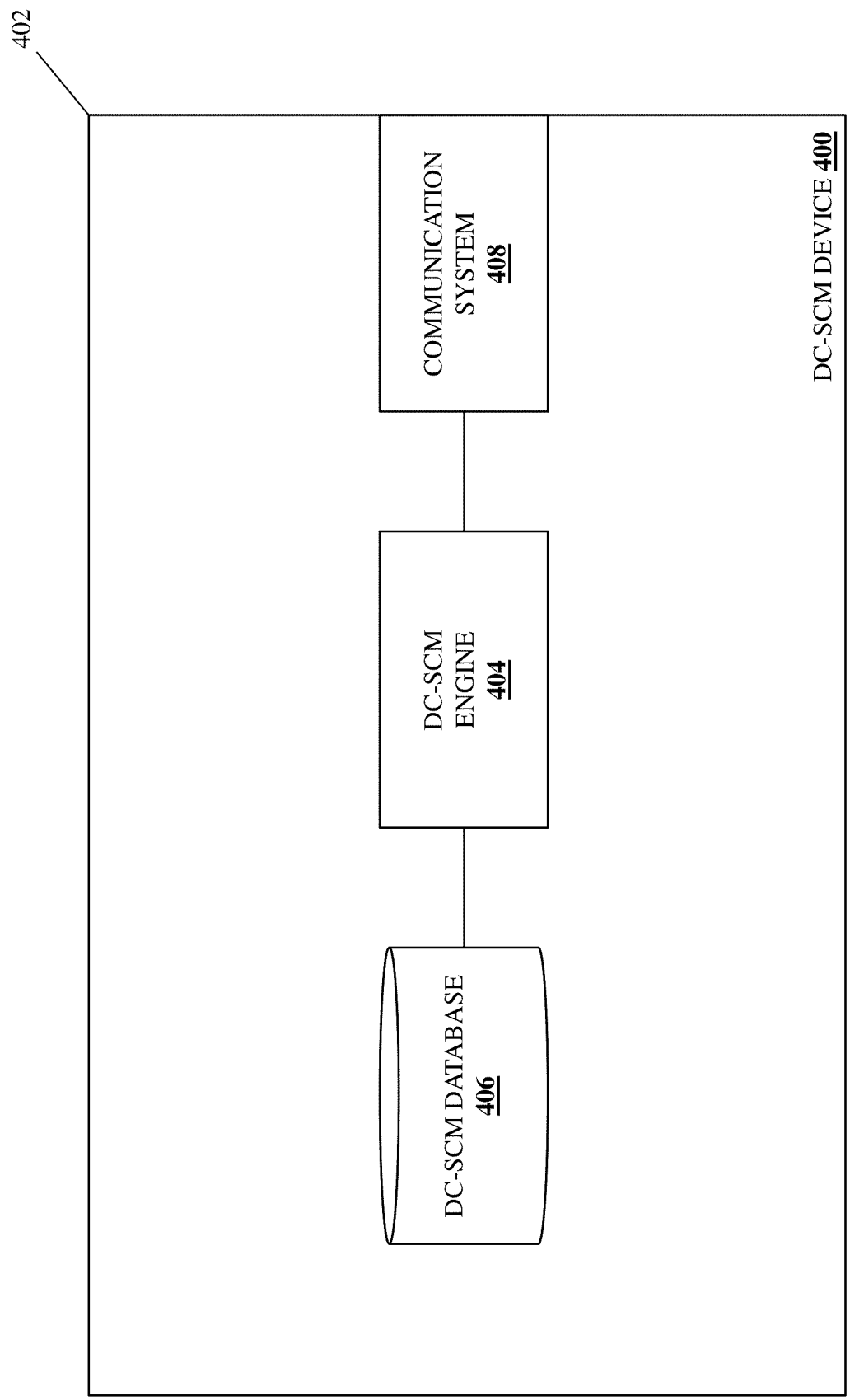
FIG. 4 is a schematic view illustrating an embodiment of a DC-SCM device that may provide the DC-SCM undiscoverable device configuration system of the present disclosure.

Referring now to FIG. 4, an embodiment of a DC-SCM device 400 is illustrated that may provide the DC-SCM device 304 discussed above with reference to FIG. 3. As such, the DC-SCM device 400 may be configured to perform Basic Input/Output System (BIOS) functionality to provide initialization and runtime operations for the DC-MHS computing device 300 (e.g., rather than via a conventional BIOS included on a conventional motherboard), Baseboard Management Controller (BMC) functionality to provide management and monitoring of hardware in the DC-MHS computing device 300 (e.g., rather than via a conventional BMC), and/or other DC-SCM functionality known in the art. In the illustrated embodiment, the DC-SCM device 400 includes a chassis 402 (e.g., a circuit board) that supports the components of the DC-SCM device 400, only some of which are illustrated and described below. For example, the chassis 402 may support a DC-SCM processing system (not illustrated, but which may be similar to the processor 102 discussed above with reference to FIG. 1) and a DC-SCM memory system (not illustrated, but which may be similar the memory 114 discussed above with reference to FIG. 1) that is coupled to the DC-SCM processing system and that includes instructions that, when executed by the DC-SCM processing system, cause the DC-SCM processing system to provide a DC-SCM engine 404 that is configured to perform the functionality of the DC-SCM engines, DC-SCM subsystems, and/or DC-SCM devices discussed below.

The chassis 402 may also support a DC-SCM storage system (not illustrated, but which may be similar to the storage 108 discussed above with reference to FIG. 1) that is coupled to the DC-SCM engine 404 (e.g., via a coupling between the DC-SCM storage system and the DC-SCM processing system) and that includes a DC-SCM database 406 that is configured to store any of the information utilized by the DC-SCM engine 404 discussed below. The chassis 402 may also support a communication system 308 that is coupled to the DC-SCM engine 404 (e.g., via a coupling between the communication system 308 and the DC-SCM processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific DC-SCM device 400 has been illustrated and described, one of skill in the art in possession of the present disclosure will recognize that DC-SCM devices (or other devices operating according to the teachings of the present disclosure in a manner similar to that described below for the DC-SCM device 400) may include a variety of components and/or component configurations for providing conventional DC-SCM device functionality, as well as the DC-SCM undiscoverable device configuration functionality discussed below, while remaining within the scope of the present disclosure as well.

Figure 5:
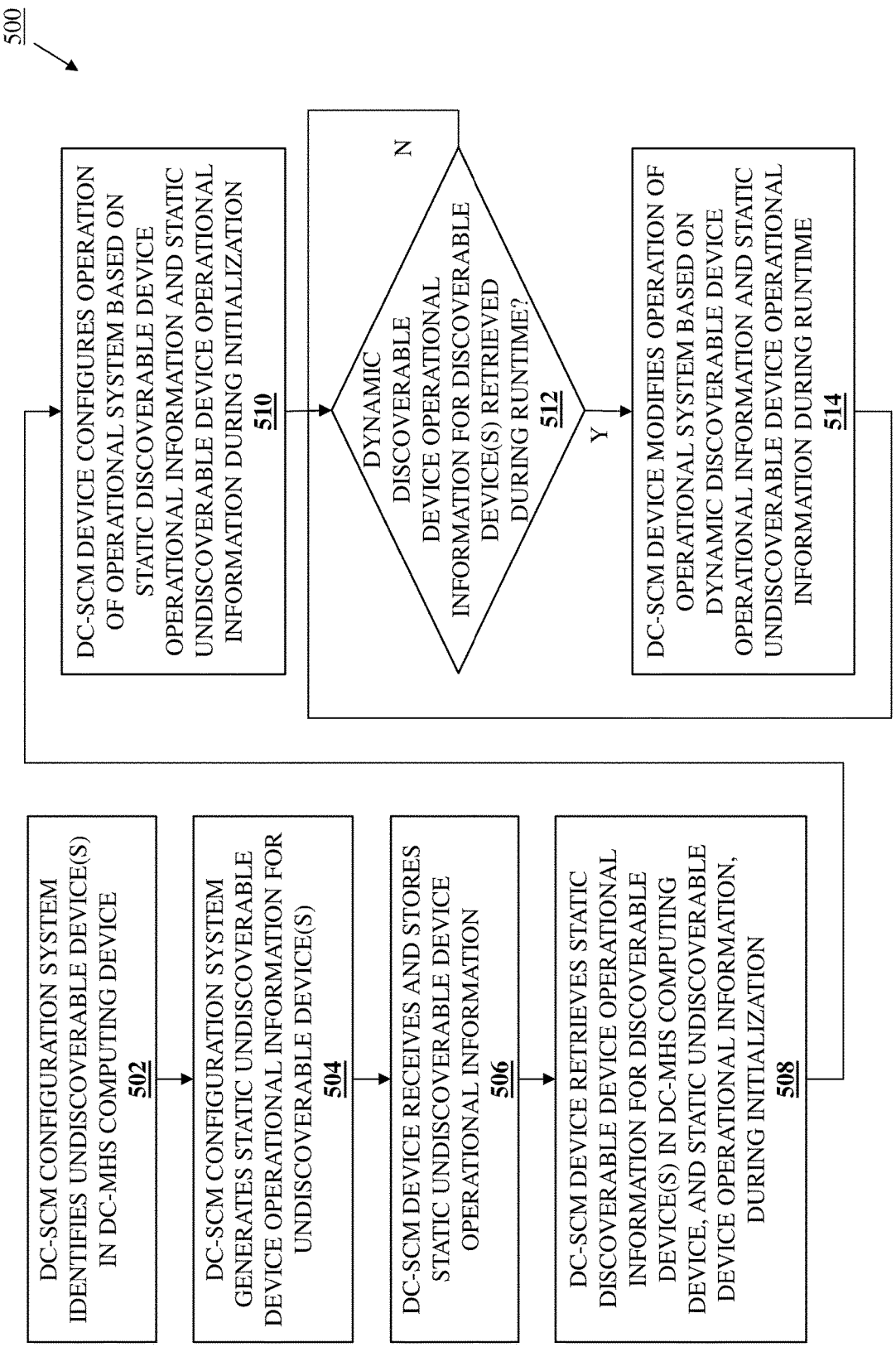
FIG. 5 is a flow chart illustrating an embodiment of a method for configuring a DC-SCM device to operate with undiscoverable devices.

Referring now to FIG. 5, an embodiment of a method 500 for configuring a DataCenter System Control Module (DC-SCM) device to operate with undiscoverable devices is illustrated. As discussed below, the systems and methods of the present disclosure allow a user of a DC-MHS computing device that includes undiscoverable device(s) to identify the undiscoverable device(s) to a DC-SCM configuration system so that it may generate static undiscoverable device operational information and provide it to the DC-MHS computing device, allowing a DC-SCM device in the DC-MHS computing device to use that static undiscoverable device operational information to configure a power subsystem, cooling subsystem, and/or other operational subsystems in the DC-MHS computing device.

For example, the DC-SCM undiscoverable device configuration system of the present disclosure may include a DC-MHS computing device with an operational system, a discoverable device, an undiscoverable device, and a DC-SCM device coupled to the operational system and the discoverable device. The DC-SCM device receives and store static undiscoverable device operation information for the undiscoverable device and, during initialization operations for the DC-MHS computing device, retrieves static discoverable device operational information for the discoverable device and the static undiscoverable device operation information and uses it to configure operation of the operational system. During runtime operations for the DC-MHS computing device, the DC-SCM device retrieves dynamic discoverable device operational information from the discoverable device and the static undiscoverable device operation information, and uses it to modify operation of the operational system. As such, DC-SCM devices may configure the operational system in a DC-MHS computing device to operate in consideration of undiscoverable devices included in that DC-MHS computing device.

Figure 6:
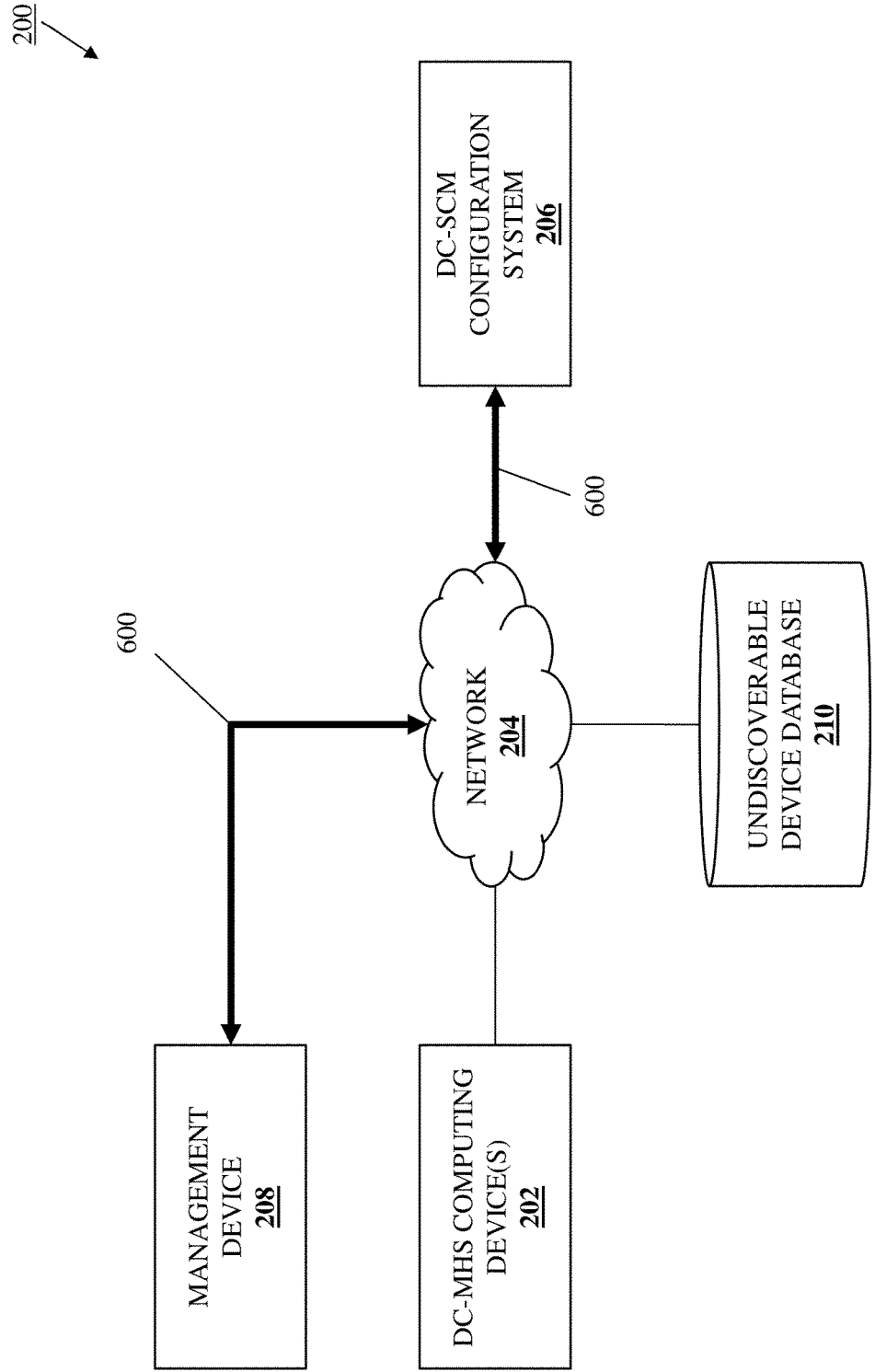
FIG. 6 is a schematic view illustrating an embodiment of the networked system of FIG. 6 operating during the method of FIG. 5.

The method 500 begins at block 502 where a DC-SCM configuration system identifies undiscoverable device(s) in a DC-MHS computing device. With reference to FIG. 6, in an embodiment of block 502, the management device 208 and the DC-SCM configuration system 206 may perform undiscoverable device identification operations 600 that may include the management device 208 identifying undiscoverable device(s) included in any of the DC-MHS computing device(s) 202 via the network 204 to the DC-SCM configuration system 206.

To provide a specific example, with reference to the DC-MHS computing device 300, a network administrator or other user of the DC-MHS computing device 300 may be provided with a DC-MHS computing device identifier (e.g., a "service tag") when the DC-MHS computing device 300 is first purchased from the DC-MHS computing device manufacturer, and one of skill in the art in possession of the present disclosure will appreciate how such a DC-MHS computing device identifier may identify a hardware configuration of the DC-MHS computing device 300 that may initially (e.g., at the time of purchase) include the discoverable device(s) 308 and may not include the undiscoverable device(s) 310. In an embodiment, following receipt of the DC-MHS computing device 300, the network administrator or other user may add the undiscoverable device(s) 310 (e.g., the AICs discussed above) to the DC-MHS computing device 300.

In an embodiment, the network administrator or other user may then access the DC-SCM configuration system 206 (e.g., a DC-SCM configuration "portal" that made accessible via the network 204 by the DC-MHS computing device manufacturer, DC-SCM device manufacturer, and/or other provider of the DC-SCM configuration system 206), identify the DC-MHS computing device 300 (e.g., via its DC-MHS computing device identifier/service tag), identify the undiscoverable device(s) 310 (e.g., the AICs discussed above) that have been added to the DC-MHS computing device 300, and/or perform any other operations that one of skill in the art in possession of the present disclosure would recognize as identifying the undiscoverable device(s) 310 in a manner that would enable the functionality described below.

To provide a specific example, in response to receiving the DC-MHS computing device identifier/service tag for the DC-MHS computing device 300, the DC-SCM configuration "portal" provided by the DC-SCM configuration system 206 may display pre-populated lists of AICs or other undiscoverable devices to the network administrator user (e.g., with those pre-populated lists generated based on other users of other DC-MHS computing devices having added those AICs or other undiscoverable devices to those DC-MHS computing devices), and the network administrator or other user may select any of the undiscoverable device(s) 310 from those pre-populated lists as part of the undiscoverable device identification operations 600 in order to identify those AICs/undiscoverable devices as having been added to the DC-MHS computing device 300. To provide another specific example, the undiscoverable device identification operations 600 may include the network administrator or other user providing the DC-MHS computing device identifier/service tag for the DC-MHS computing device 300, and then providing an undiscoverable device vendor identifier, an undiscoverable device serial number, and/or any other undiscoverable device information for each of the undiscoverable device(s) 310 that one of skill in the art in possession of the present disclosure would recognize as enabling the functionality described below.

However, while specific examples of the identification (and reasons for identification) of undiscoverable device(s) in a DC-MHS computing device to a DC-SCM configuration system has been described, one of skill in the art in possession of the present disclosure will appreciate how undiscoverable device(s) in a DC-MHS computing device may be identified to a DC-SCM configuration system in a variety of manners (and for a variety of reasons) that will fall within the scope of the present disclosure as well.

Figure 7:
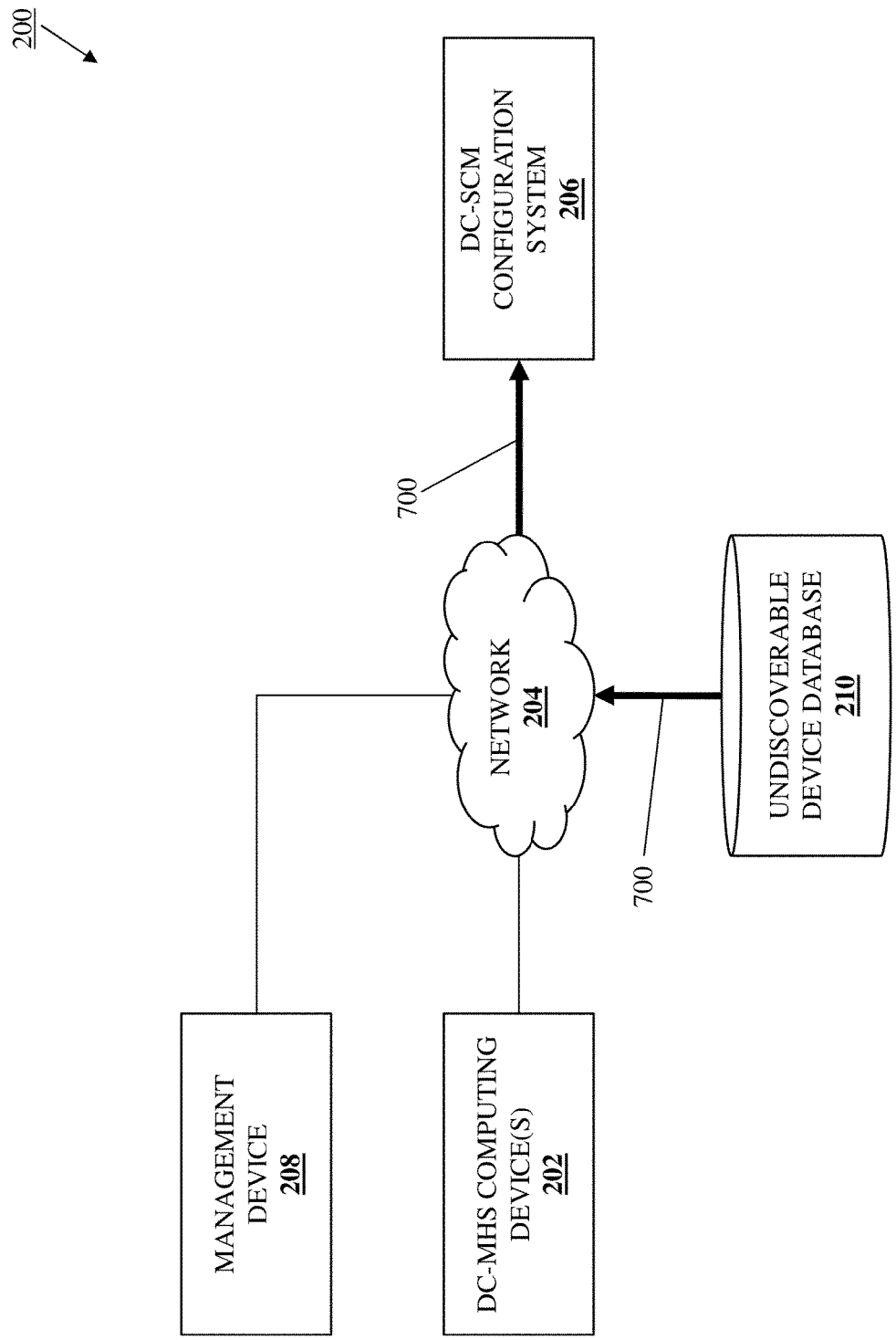
FIG. 7 is a schematic view illustrating an embodiment of the networked system of FIG. 6 operating during the method of FIG. 5.

The method 500 then proceeds to block 504 where the DC-SCM configuration system generates static undiscoverable device operational information for the undiscoverable device(s). With reference to FIG. 7, in an embodiment of block 504, the DC-SCM configuration system 206 may perform undiscoverable device information retrieval operations 700 that may include retrieving undiscoverable device information for any undiscoverable devices identified for the DC-MHS computing device 300 at block 502 via the network 204 and from the undiscoverable device database 210. For example, the undiscoverable device database 210 may be provided by one or more undiscoverable device manufacturers or vendors, and the DC-SCM configuration system 206 may retrieve undiscoverable device information for any undiscoverable devices identified for the DC-MHS computing device 300 via the network 204 from those undiscoverable device manufacturers or vendors.

In another example, the undiscoverable device database 210 may be provided by the DC-SCM configuration system 206, and may include undiscoverable device information for any undiscoverable devices previously identified to the DC-SCM configuration system 206 for other DC-MHS computing device (and previously retrieved from the undiscoverable device manufacturers or vendors for those undiscoverable devices). As such, while illustrated and described as being coupled to the DC-SCM configuration system 206 via the network 204, one of skill in the art in possession of the present disclosure will appreciate how the DC-SCM configuration system 206 may retrieve the undiscoverable device information from the undiscoverable device database 210 included in the DC-SCM configuration system 206 for any undiscoverable devices identified for the DC-MHS computing device 300 at block 502 while remaining within the scope of the present disclosure as well.

In an embodiment, the undiscoverable device information retrieved for any undiscoverable device identified for the DC-MHS computing device 300 at block 502 may include power characteristics of that undiscoverable device during its operation (e.g., a maximum power usage of that undiscoverable device during its operation, an average power usage of that undiscoverable device during its operation, and/or any other power characteristics that would be apparent to one of skill in the art in possession of the present disclosure), thermal characteristics of that undiscoverable device during its operation (e.g., a maximum temperature generation of that undiscoverable device during its operation, an average temperature generation of that undiscoverable device during its operation, and/or any other thermal characteristics that would be apparent to one of skill in the art in possession of the present disclosure), information about technologies supported by devices, information about features enables on devices, resource requirements for devices, security features on devices requiring support, and/or any other device operational characteristics that one of skill in the art in possession of the present disclosure would recognize as allowing for the DC-SCM operations described below.

In an embodiment, at block 504, the DC-SCM configuration system 206 may perform static undiscoverable device operational information generation operations that may include using the undiscoverable device information retrieved as described above to generate static undiscoverable device operational information. For example, at block 504 the DC-SCM configuration system 206 may utilize the "known" hardware configuration of the DC-MHS computing device 300 (i.e., hardware configuration of the DC-MHS computing deice 300 that includes the discoverable device (s) 308 that were initially configured in the DC-MHS computing device 300) and the undiscoverable device information for the undiscoverable device(s) 310 that were identified to the DC-SCM configuration system 206 to generate a "system composition image" file for the DC-MHS computing device 300 that provides the static undiscoverable device operational information and that may include static information about an overall hardware and firmware configuration of the DC-MHS computing device 300 that has power characteristics, thermal characteristics, and/or other operational characteristics based on the discoverable device(s) 308 and the undiscoverable device(s) 310 included in the DC-MHS computing device 300.

Continuing with the specific example provided above, the DC-SCM configuration system 206 may use the power characteristics, thermal characteristics, and/or other operational characteristics included in the undiscoverable device information for the undiscoverable device(s) 310 that were identified to the DC-SCM configuration system 206 in order to generate the static undiscoverable device operational information that one of skill in the art in possession of the present disclosure will appreciate may be configured for use by the DC-SCM device 304 in the DC-MHS computing device 300 to control the power subsystem 312, the cooling subsystem 314, and/or other operational subsystems in the operational system provided in the DC-MHS computing device 300 in consideration of the operation of the undiscoverable device(s) 310. As such, the static undiscoverable device operational information may include static data for the undiscoverable device(s) 310 that is configured for use by the DC-SCM device 304 to compute power requirements, thermal requirements, and/or any other operational requirements for the DC-MHS computing device 300 as described below. However, while specific examples of static undiscoverable device operational information have been described, one of skill in the art in possession of the present disclosure will appreciate how the static undiscoverable device operational information of the present disclosure may include a variety of information associated with the undiscoverable devices while remaining within the scope of the present disclosure as well.

Figure 8A:
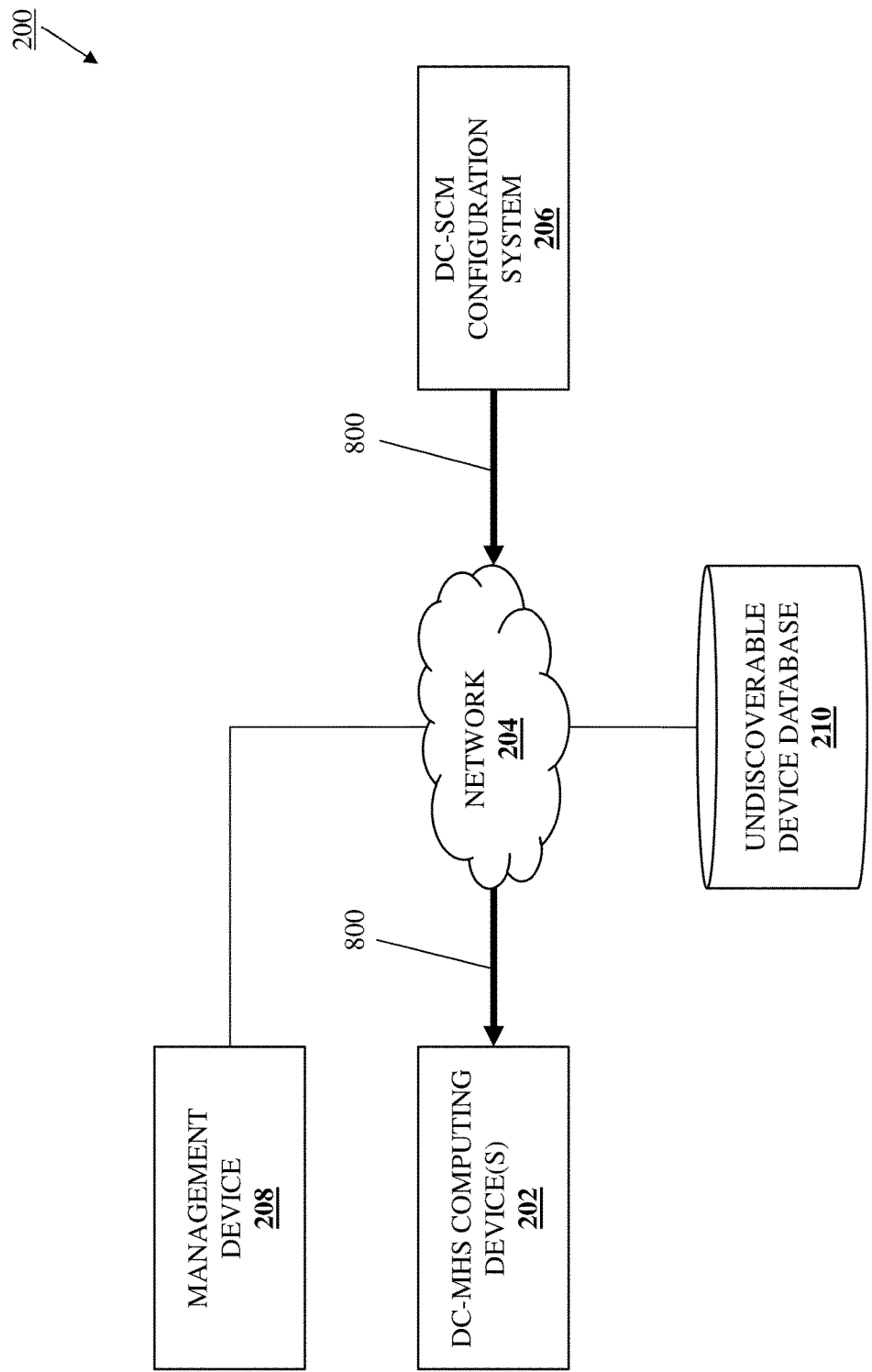
FIG. 8A is a schematic view illustrating an embodiment of the networked system of FIG. 6 operating during the method of FIG. 5.
Figure 8B:
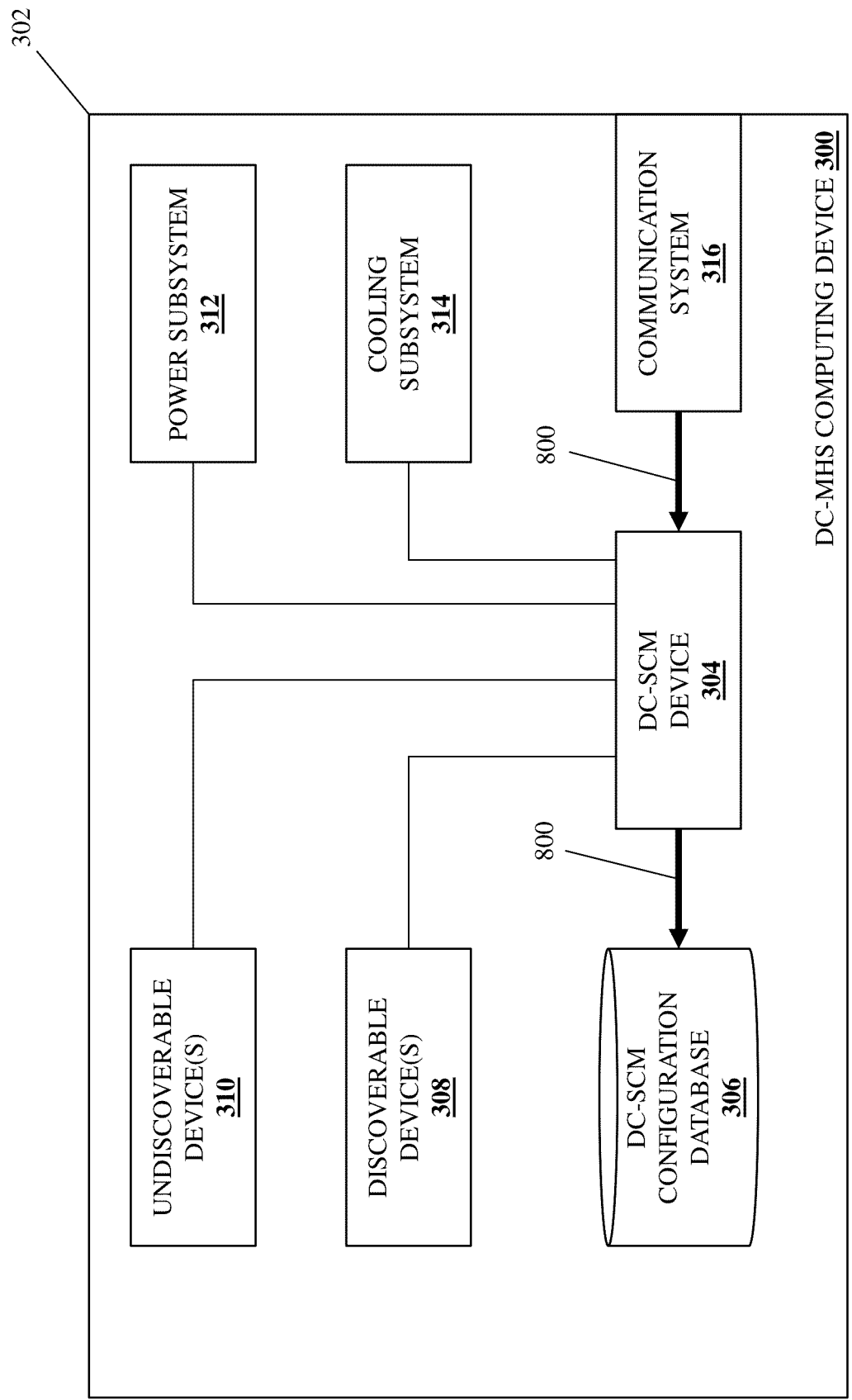
FIG. 8B is a schematic view illustrating an embodiment of the DC-MHS computing device of FIG. 3 operating during the method of FIG. 5.

The method 500 then proceeds to block 506 where a DC-SCM device receives and stores the static undiscoverable device operational information. With reference to FIGS. 8A and 8B, in an embodiment of block 506, the DC-SCM configuration system 206 may perform static undiscoverable device operational information provisioning operations 800 that include transmitting the static undiscoverable device operational information generated at block 504 to the DC-MHS computing device 202/300 such that the DC-SCM device 304 receives the static undiscoverable device operational information via the communication system 316 and stores it in the DC-SCM configuration database 306. For example, at block 506, the DC-SCM device 304 may store the static undiscoverable device operational information to a flash memory/storage device that is included on a motherboard in the DC-MHS computing device 300 such as, for example, an HPM storage device, although other locations for the DC-SCM configuration database 306 and/or the storage of the static undiscoverable device operational information will fall within the scope of the present disclosure as well.

Figure 9A:
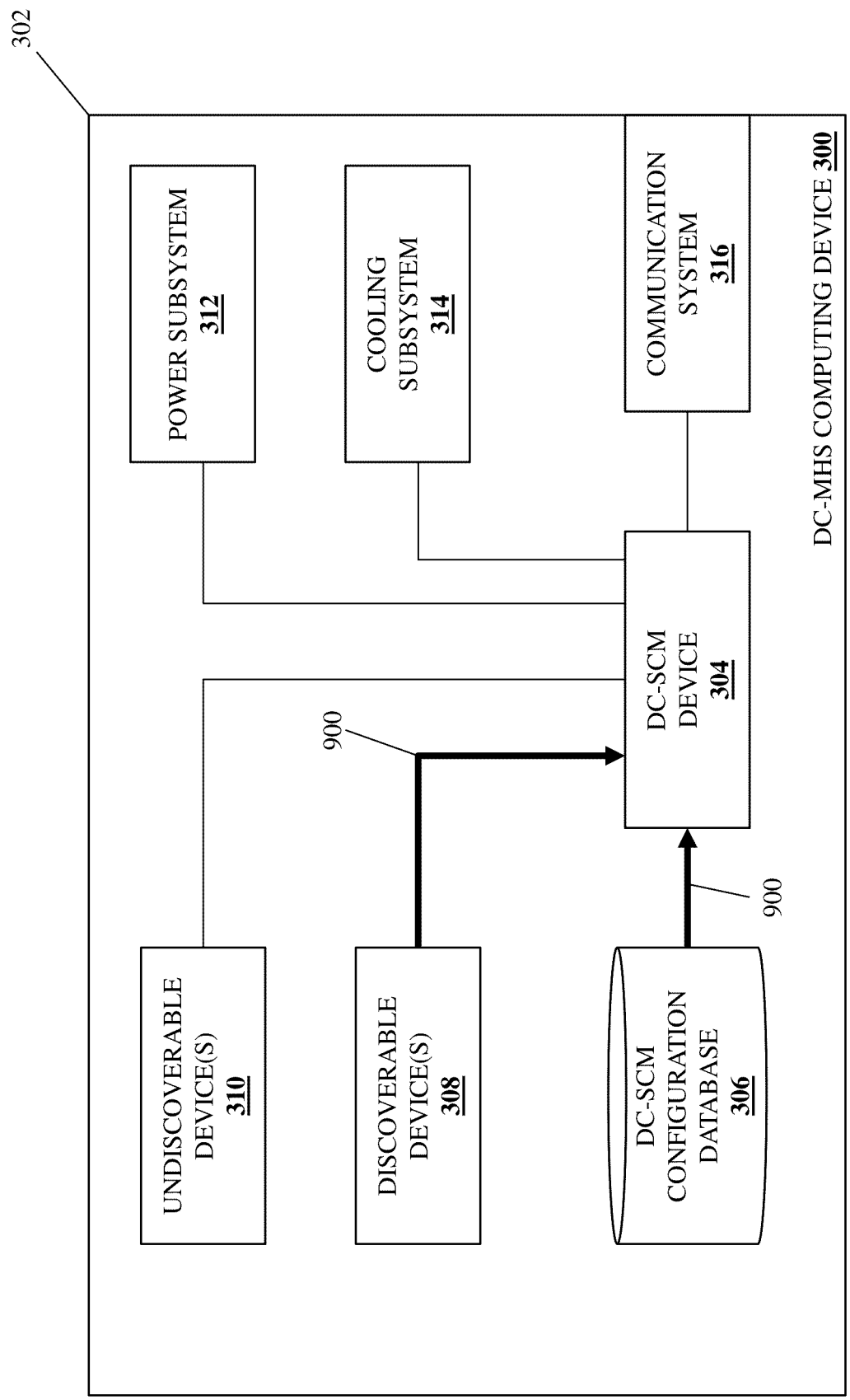
FIG. 9A is a schematic view illustrating an embodiment of the DC-MHS computing device of FIG. 3 operating during the method of FIG. 5.
Figure 9B:
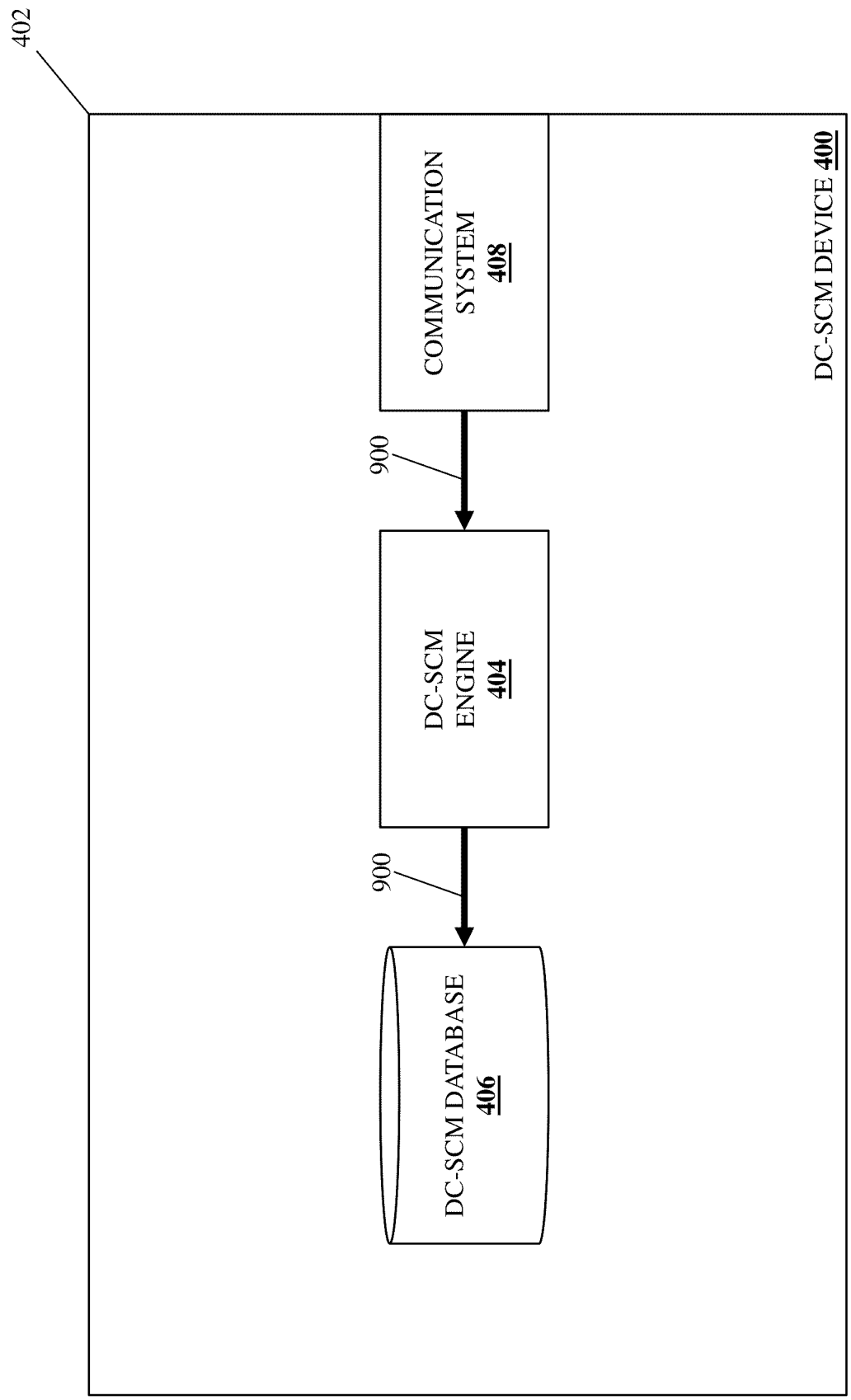
FIG. 9B is a schematic view illustrating an embodiment of the DC-SCM device of FIG. 4 operating during the method of FIG. 5.

The method 500 then proceeds to block 508 where the DC-SCM device retrieves static discoverable device operational information for one or more discoverable device(s) in the DC-MHS computing device, and the static undiscoverable device operational information, during initialization. With reference to FIGS. 9A and 9B, in an embodiment of block 508, the DC-MHS computing device 300 may be powered on, reset, rebooted, and/or otherwise initialized and, in response, the DC-SCM engine 404 in the DC-SCM device 304/400 may perform operational information retrieval operations 900 that include retrieving the static undiscoverable device operational information from the DC-SCM configuration database 306 via the communication system 408, and retrieving static discoverable device operational information for the discoverable device(s) 308 from the DC-SCM configuration database 306 (or from the discoverable device(s) 308 themselves) via the communication system 408, and storing the static undiscoverable device operational information and the static discoverable device operational information in the DC-SCM database 406.

As will be appreciated by one of skill in the art in possession of the present disclosure, the static discoverable device operational information for the discoverable device (s) 308 may be similar to the static undiscoverable device operational information described above, and thus may include power characteristics of that discoverable device during its operation (e.g., a maximum power usage of that discoverable device during its operation, an average power usage of that discoverable device during its operation, and/or any other power characteristics that would be apparent to one of skill in the art in possession of the present disclosure), thermal characteristics of that discoverable device during its operation (e.g., a maximum temperature generation of that discoverable device during its operation, an average temperature generation of that discoverable device during its operation, and/or any other thermal characteristics that would be apparent to one of skill in the art in possession of the present disclosure), and/or any other device operational characteristics that one of skill in the art in possession of the present disclosure would recognize as allowing for the DC-SCM operations described below.

As discussed above, the static discoverable device operational information for the discoverable device(s) 308 may be retrieved at block 508 from the DC-SCM configuration database 306, and thus that static discoverable device operational information may have been previously stored in the DC-SCM configuration database 306 for use as part of the initialization of the DC-MHS computing device 300. However, as also discussed above, the static discoverable device operational information for the discoverable device(s) 308 may instead be retrieved at block 508 from the discoverable device(s) 308 themselves, and thus that static discoverable device operational information may be made available from the discoverable device(s) 308 for use as part of the initialization of the DC-MHS computing device 300 (e.g., following their discovery, discussed in further detail below). However, while a few specific examples of static discoverable device operational information have been described, one of skill in the art in possession of the present disclosure will appreciate how the static discoverable device operational information and its use may vary while remaining within the scope of the present disclosure. For example, in some embodiments, static discoverable device operational information may not be retrieved from the discoverable device(s) 308 at block 508, and instead only the dynamic discoverable device operational information generated by the discoverable device(s) 308 as described below may be used to configure the operation of the operational system in the DC-MHS computing device 300 to address the operation of the discoverable device(s) 308.

Figure 10B:
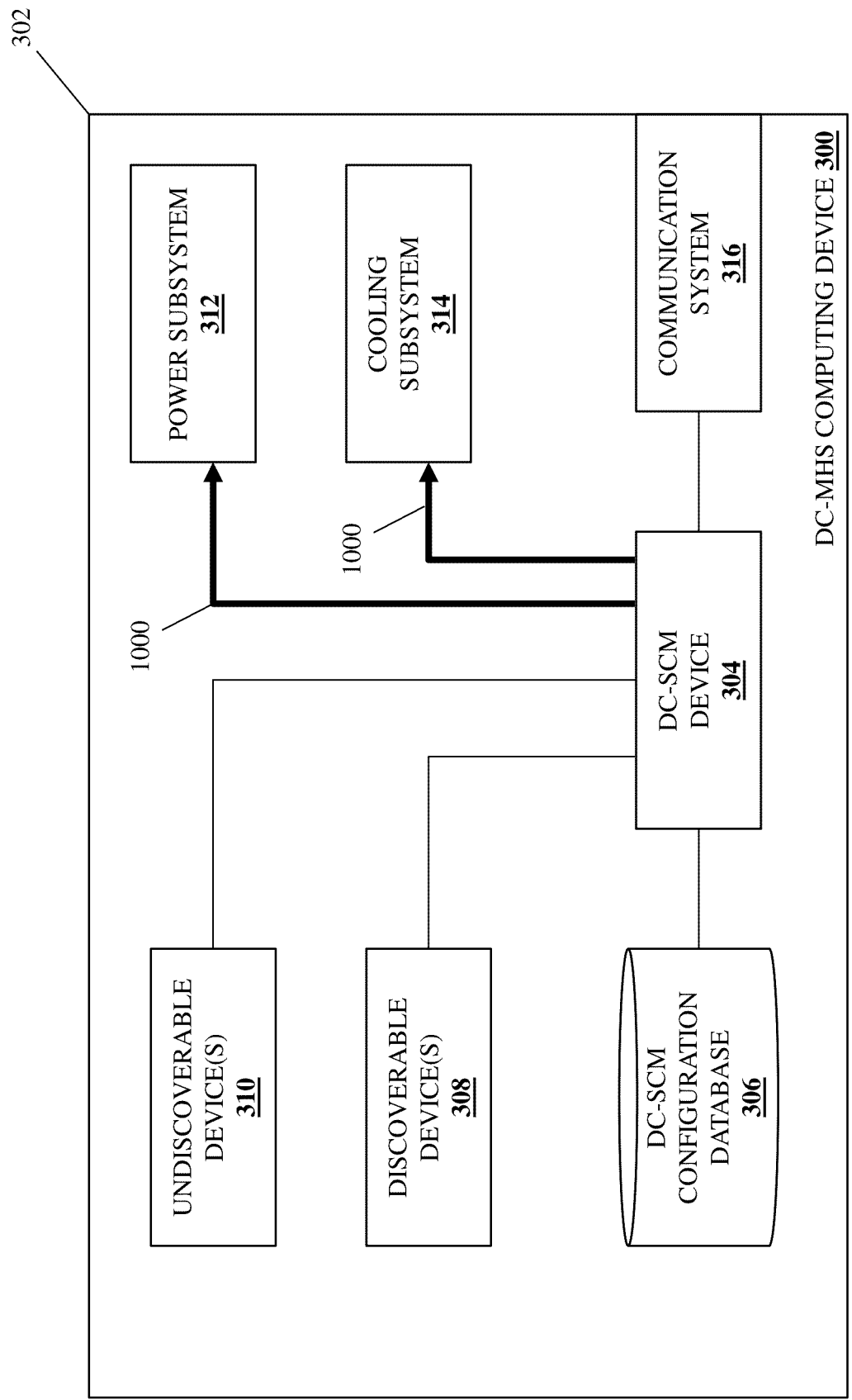
FIG. 10B is a schematic view illustrating an embodiment of the DC-MHS computing device of FIG. 3 operating during the method of FIG. 5.

The method 500 then proceeds to block 510 where the DC-SCM device configures operation of an operational system based on the static discoverable device operational information and the static undiscoverable device operational information during initialization. With reference to FIGS. 10A and 10B, in an embodiment of block 510 and during the initialization of the computing device 300, the DC-SCM engine 404 in the DC-SCM device 304/400 may perform operational system configuration operations 1000 that may include retrieving the static discoverable device operational information and the static undiscoverable device operational information that was stored in the DC-SCM database 406 at block 508, and using that static discoverable device operational information and the static undiscoverable device operational information to configure the power subsystem 312, the cooling subsystem 314, and/or any other operational subsystem in the operational system of the DC-MHS computing device via its communication system 408.

For example, as will be appreciated by one of skill in the art in possession of the present disclosure, the DC-SCM engine 404 may use the power characteristics of the discoverable device(s) 308 in the static discoverable device operational information, the power characteristics of the undiscoverable device(s) 310 in the static undiscoverable device operational information, and/or any other power characteristic information for the DC-MHS computing device 300 that would be apparent to one of skill in the art in possession of the present disclosure to configure the power subsystem 312 to power the discoverable device(s) 308, the undiscoverable device(s) 310, and/or any other components in the DC-MHS computing device 300. To provide a specific example, an initial configuration of the power subsystem 312 based on the power characteristics of the discoverable device(s) 308 in the static discoverable device operational information and the power characteristics of the undiscoverable device(s) 310 in the static undiscoverable device operational information may include configuration of the power subsystem 312 to supply power based on the average power consumption identified for the discoverable device(s) 308 and the undiscoverable device(s) 310 in the in the static discoverable device operational information and the static undiscoverable device operational information, respectively.

In another example, as will be appreciated by one of skill in the art in possession of the present disclosure, the DC-SCM engine 404 may use the thermal characteristics of the discoverable device(s) 308 in the static discoverable device operational information, the thermal characteristics of the undiscoverable device(s) 310 in the static undiscoverable device operational information, and/or any other thermal characteristic information for the DC-MHS computing device 300 that would be apparent to one of skill in the art in possession of the present disclosure to configure the cooling subsystem 314 to cool the discoverable device(s) 308, the undiscoverable device(s) 310, and/or any other components in the DC-MHS computing device 300. To provide a specific example, an initial configuration of the cooling subsystem 314 based on the thermal characteristics of the discoverable device(s) 308 in the static discoverable device operational information and the thermal characteristics of the undiscoverable device(s) 310 in the static undiscoverable device operational information may include configuration of the cooling subsystem 314 to provide cooling based on the average temperature generation identified for the discoverable device(s) 308 and the undiscoverable device(s) 310 in the in the static discoverable device operational information and the static undiscoverable device operational information, respectively.

However, while two specific examples of the configuration of the operational subsystems in the operational system of the DC-MHS computing device 300 using the static discoverable device operational information and the static undiscoverable device operational information have been described, one of skill in the art in possession of the present disclosure will appreciate how other operational subsystems in the operational system of the DC-MHS computing device 300 may be configured using the static discoverable device operational information and the static undiscoverable device operational information in a variety of manners while remaining within the scope of the present disclosure as well.

While not illustrated or described in detail in detail, one of skill in the art in possession of the present disclosure will appreciate how the DC-SCM engine 404 in the DC-SCM device 304/400 may utilize the static discoverable device operational information to configure hardware interface(s) to the undiscoverable device(s) 310 as well. As such, while the undiscoverable device(s) 310 may be undiscoverable by the DC-SCM engine 404 in the DC-SCM device 304/400, the static discoverable device operational information may allow the DC-SCM engine 404 to identify a hardware interface coupled to an undiscoverable device, and configure that hardware interface in a manner that one of skill in the art in possession of the present disclosure would recognize as enhancing at least some operations of that undiscoverable device.

The method 500 then proceeds to decision block 512 depending on whether dynamic discoverable device operational information is retrieved during runtime. As will be appreciated by one of skill in the art in possession of the present disclosure, the initialization of the DC-MHS computing device 300 may include the DC-SCM engine 404 in the DC-SCM device 304/400 discovering the discoverable device(s) 308 using any of a variety of device discovery techniques that would be apparent to one of skill in the art in possession of the present disclosure. However, as discussed above, the undiscoverable device(s) 310 may not be configured (e.g., with hardware interfaces, software protocols, etc.) to be discovered by the DC-SCM engine 204 in that DC-SCM device 304/400 and/or to enable BIOS and/or BMC functionality available from the DC-SCM engine 404, and/or may not been not validated by the DC-SCM device manufacturer and/or DC-MHS computing device manufacturer as being configured to operate with the DC-SCM device 304/400.

As such, following the completion of the initialization of the DC-MHS computing device 300, the DC-MHS computing device 300 may enter a runtime state (e.g., in which an operating system controls the DC-MHS computing device 300), and the power subsystem 312, cooling subsystem 314, and/or other operational subsystems in the operational system of the DC-MHS computing device 300 may operate according to the configuration provided at block 510. Furthermore, one of skill in the art in possession of the present disclosure will appreciate how the discoverable device(s) 308 may operate during the runtime state of the DC-MHS computing device 300 and, in response, generate dynamic discoverable device operational information that is similar to the static discoverable device operational information described above but that includes current power characteristics (e.g., a current power requirement) for that discoverable device, current thermal characteristics (e.g., a current temperature) for the discoverable device, and/or any other operational characteristics that would be apparent to one of skill in the art in possession of the present disclosure. If, at decision block 512, dynamic discoverable device operational information is not retrieved during runtime, the method 500 returns to decision block 512. As such, the method 500 may loop such that the power subsystem 312, cooling subsystem 314, and/or other operational subsystems in the operational system of the DC-MHS computing device 300 operate according to the configuration provided at block 510 until dynamic discoverable device operational information is retrieved during runtime.

Figure 11A:
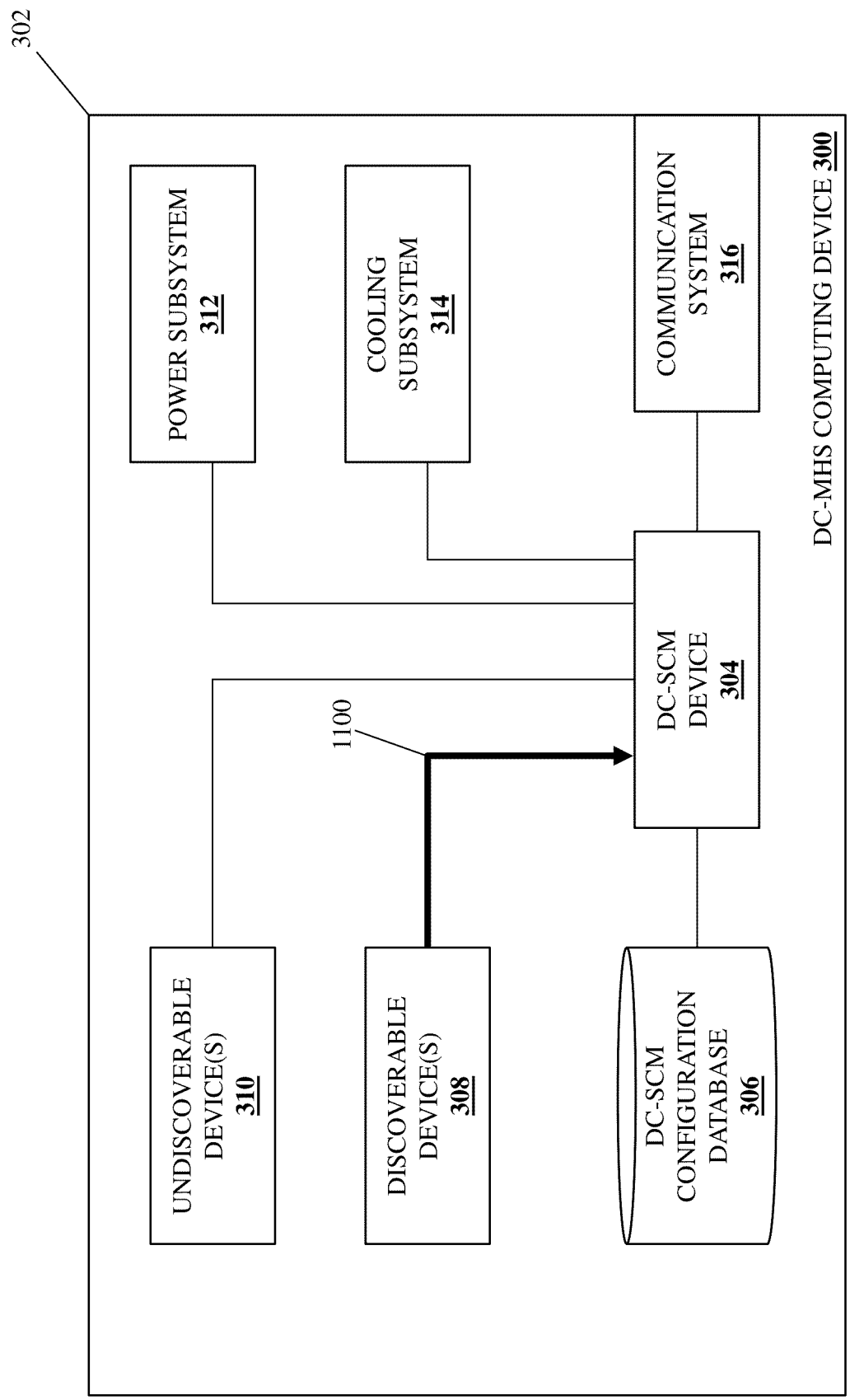
FIG. 11A is a schematic view illustrating an embodiment of the DC-MHS computing device of FIG. 3 operating during the method of FIG. 5.
Figure 11B:
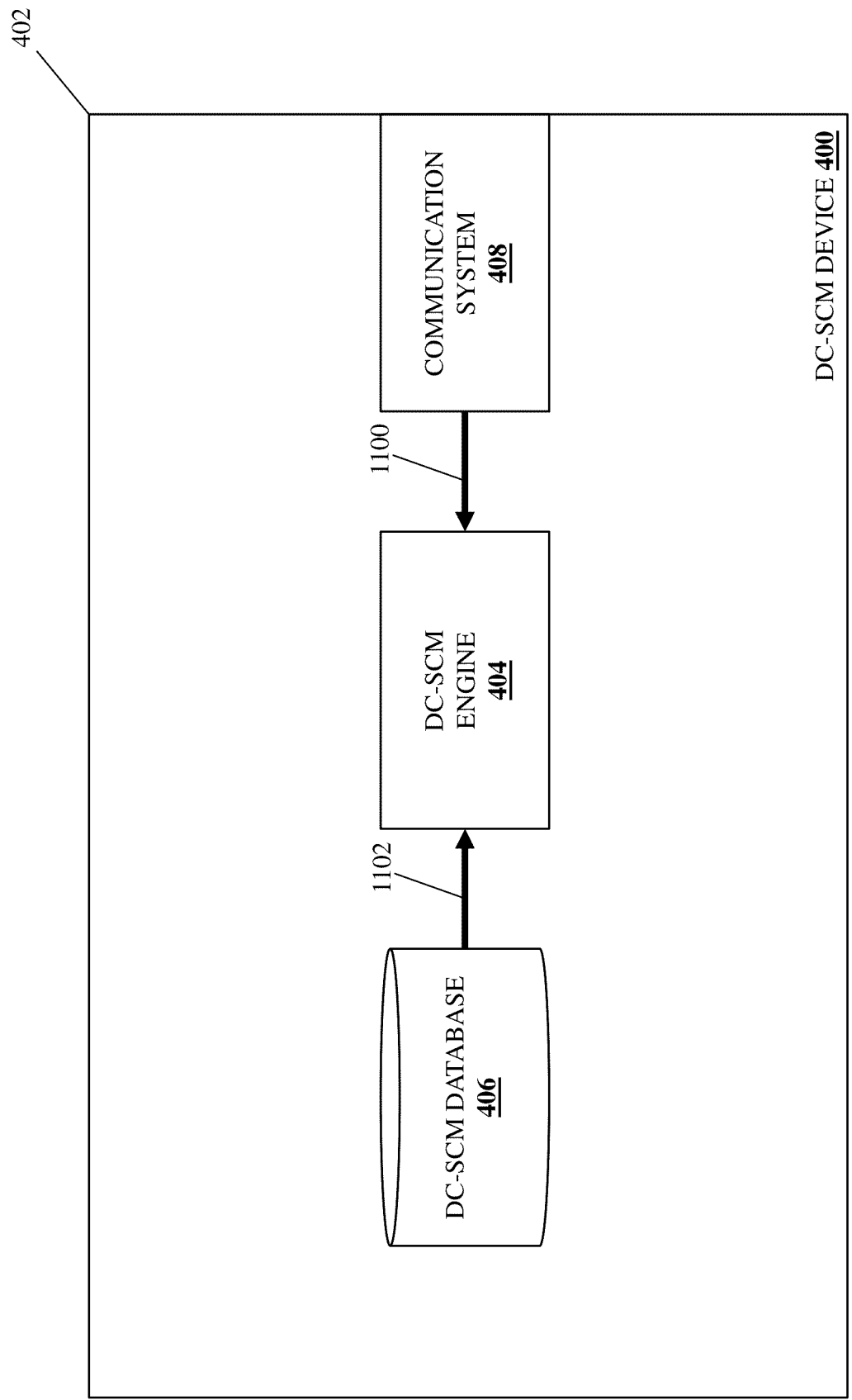
FIG. 11B is a schematic view illustrating an embodiment of the DC-SCM device of FIG. 4 operating during the method of FIG. 5.

If, at decision block 512, dynamic discoverable device operational information is retrieved during runtime, the method 500 proceeds to block 514 where the DC-SCM device modifies operation of the operational system based on the dynamic discoverable device operational information and the static undiscoverable device operational information during runtime. With reference to FIGS. 11A and 11B, in an embodiment of block 514, the DC-SCM engine 404 in the DC-SCM device 304/400 may perform dynamic discoverable device operational information retrieval operations 1100 that may include retrieving dynamic discoverable device operational information generated via the operation of any of the discoverable device(s) 308 via its communication system 408. Furthermore, the DC-SCM engine 404 in the DC-SCM device 304/400 may also perform static undiscoverable device operational information retrieval operations 1102 that may include retrieving the static undiscoverable device operational information that was stored in the DC-SCM database 406 at block 508.

Figure 11D:
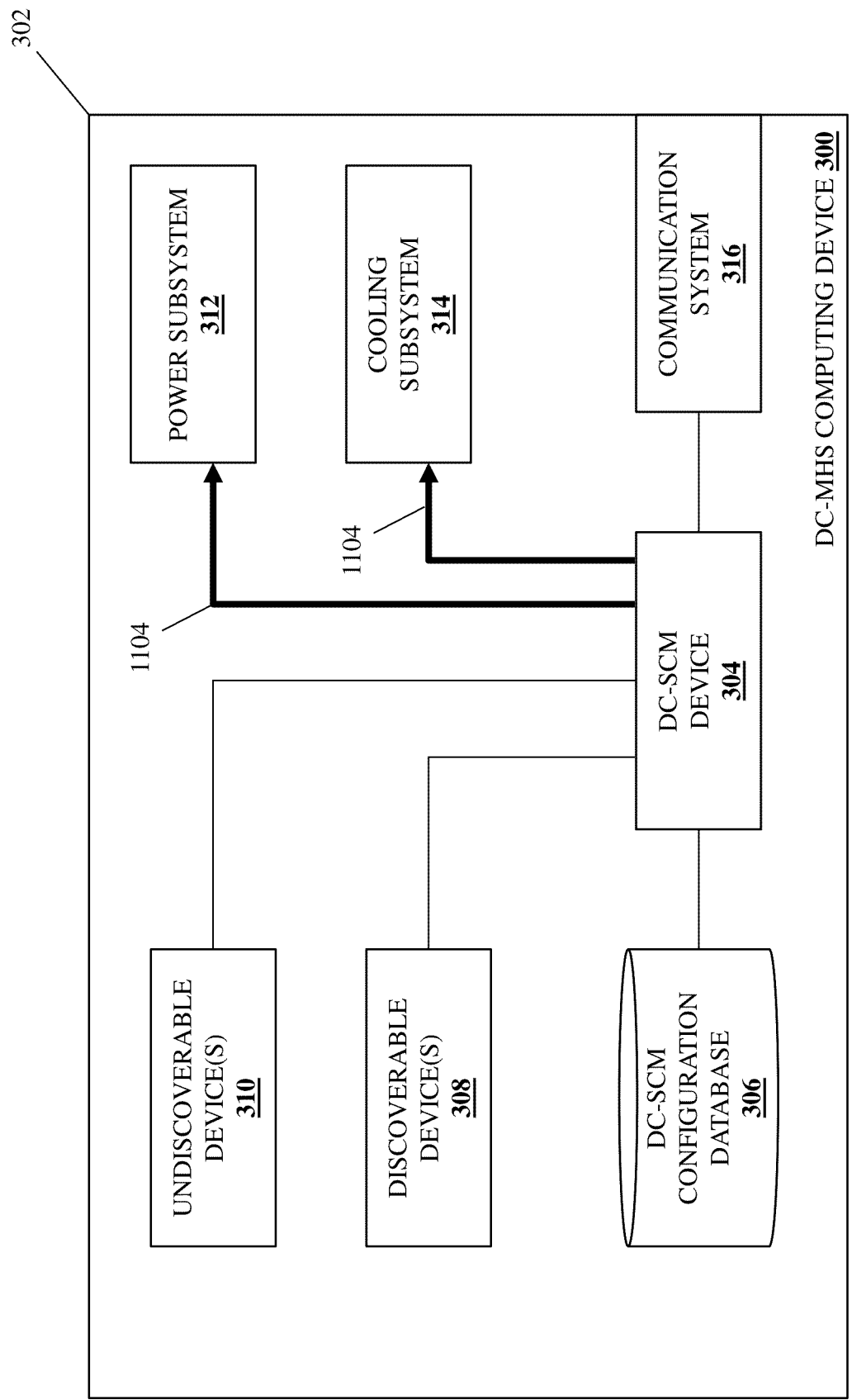
FIG. 11D is a schematic view illustrating an embodiment of the DC-MHS computing device of FIG. 3 operating during the method of FIG. 5.

Furthermore, with reference to FIGS. 11C and 11D, at block 510 the DC-SCM engine 404 in the DC-SCM device 304/400 may perform operational system configuration operations 1104 that may include using the dynamic discoverable device operational information and the static undiscoverable device operational information to configure the power subsystem 312, the cooling subsystem 314, and/or any other operational subsystem in the operational system of the DC-MHS computing device via its communication system 408.

For example, as will be appreciated by one of skill in the art in possession of the present disclosure, the DC-SCM engine 404 may use the power characteristics of the discoverable device(s) 308 in the dynamic discoverable device operational information, the power characteristics of the undiscoverable device(s) 310 in the static undiscoverable device operational information, and/or any other power characteristic information for the DC-MHS computing device 300 that would be apparent to one of skill in the art in possession of the present disclosure to configure the power subsystem 312 to power the discoverable device(s) 308, the undiscoverable device(s) 310, and/or any other components in the DC-MHS computing device 300. As such, in some examples, the modification of the configuration of the power subsystem 312 may be based on the power characteristics of the discoverable device(s) 308 in the dynamic discoverable device operational information and the power characteristics of the undiscoverable device(s) 310 in the static undiscoverable device operational information.

However, in a specific example, an modification of the configuration of the power subsystem 312 based on the power characteristics of the discoverable device(s) 308 in the dynamic discoverable device operational information and the power characteristics of the undiscoverable device(s) 310 in the static undiscoverable device operational information may include configuration of the power subsystem 312 to supply power based on the current power consumption identified for the discoverable device(s) 308 in the dynamic discoverable device operational information, and an extrapolation of the power characteristics of the undiscoverable device(s) 310 that are identified in the static undiscoverable device operational information and that may be based on the current power consumption identified for the discoverable device(s) 308 in the dynamic discoverable device operational information (e.g., if the current power consumption identified for the discoverable device(s) 308 is 75% their maximum power consumption, the undiscoverable device(s) 310 may be provided 75% their maximum power consumption).

In another example, as will be appreciated by one of skill in the art in possession of the present disclosure, the DC-SCM engine 404 may use the thermal characteristics of the discoverable device(s) 308 in the dynamic discoverable device operational information, the thermal characteristics of the undiscoverable device(s) 310 in the static undiscoverable device operational information, and/or any other thermal characteristic information for the DC-MHS computing device 300 that would be apparent to one of skill in the art in possession of the present disclosure to configure the cooling subsystem 314 to cool the discoverable device(s) 308, the undiscoverable device(s) 310, and/or any other components in the DC-MHS computing device 300. As such, in some examples, the modification of the configuration of the power subsystem 312 may be based on the thermal characteristics of the discoverable device(s) 308 in the dynamic discoverable device operational information and the thermal characteristics of the undiscoverable device(s) 310 in the static undiscoverable device operational information.

However, in a specific example, an modification of the configuration of the cooling subsystem 314 based on the thermal characteristics of the discoverable device(s) 308 in the dynamic discoverable device operational information and the thermal characteristics of the undiscoverable device(s) 310 in the static undiscoverable device operational information may include configuration of the cooling subsystem 314 to provide cooling based on the current temperature generation identified for the discoverable device(s) 308 in the dynamic discoverable device operational information, and an extrapolation of the thermal characteristics of the undiscoverable device(s) 310 that are identified in the static undiscoverable device operational information and that may be based on the current temperature generation identified for the discoverable device(s) 308 in the dynamic discoverable device operational information (e.g., if the current temperature generation identified for the discoverable device(s) 308 is 75% their maximum temperature generation, the undiscoverable device(s) 310 may be assumed to be generating 75% their maximum temperature generation, and cooling may be provided based on that assumption).

Furthermore, while two specific examples of the configuration of the operational subsystems in the operational system of the DC-MHS computing device 300 using the dynamic discoverable device operational information and the static undiscoverable device operational information have been described, one of skill in the art in possession of the present disclosure will appreciate how other operational subsystems in the operational system of the DC-MHS computing device 300 may be configured using the dynamic discoverable device operational information and the static undiscoverable device operational information while remaining within the scope of the present disclosure as well.

The method 500 then returns to decision block 512. As such, the method 500 may loop such that the operation of the operation system in the DC-MHS computing device 300 may be modified whenever dynamic discoverable device operational information is retrieved from the discoverable device(s) 308 using that dynamic discoverable device operational information and the static undiscoverable device operational information stored in the DC-SCM configuration database 306. Furthermore, while not illustrated or described herein in detail, one of skill in the art in possession of the present disclosure will appreciate how the dynamic discoverable device operational information and the static undiscoverable device operational information may be utilized during any iteration of the method 300 to reconfigure any of the discoverable device(s) 308 to, for example, adjust the operation of that discoverable device in order to change the current power characteristics, thermal characteristics, or other operational characteristics of that discoverable device.

Furthermore, one of skill in the art in possession of the present disclosure will appreciate how the static undiscoverable device operational information may be utilized to enhance warranty operations, support, and/or other services for the DC-MHS computing device. For example, the awareness of the undiscoverable device(s) 310 in the DC-MHS computing device 300 may allow the undiscoverable device(s) 310 to be considered during support operations (e.g., in the troubleshooting of issues with the DC-MHS computing device 300), or taken into account when offering or satisfying a warranty on the DC-MHS computing device 300.

Thus, systems and methods have been described that allow a user of a DC-MHS computing device that includes undiscoverable device(s) to identify the undiscoverable device(s) to a DC-SCM configuration system so that it may generate static undiscoverable device operational information and provide it to the DC-MHS computing device, allowing a DC-SCM device in the DC-MHS computing device to use that static undiscoverable device operational information to configure a power subsystem, cooling subsystem, and/or other operational subsystems in the DC-MHS computing device. For example, the DC-SCM undiscoverable device configuration system of the present disclosure may include a DC-MHS computing device with an operational system, a discoverable device, an undiscoverable device, and a DC-SCM device coupled to the operational system and the discoverable device. The DC-SCM device receives and store static undiscoverable device operation information for the undiscoverable device and, during initialization operations for the DC-MHS computing device, retrieves static discoverable device operational information for the discoverable device and the static undiscoverable device operation information and uses it to configure operation of the operational system. During runtime operations for the DC-MHS computing device, the DC-SCM device retrieves dynamic discoverable device operational information from the discoverable device and the static undiscoverable device operation information, and uses it to modify operation of the operational system. As such, DC-SCM devices may configure the operational system in a DC-MHS computing device to operate in consideration of undiscoverable devices included in that DC-MHS computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A DataCenter System Control Module (DC-SCM) undiscoverable device configuration system, comprising:
   a DataCenter Modular Hardware System (DC-MHS) computing device;
   an operational system that is included in the DC-MHS computing device;
   a discoverable device that is included in the DC-MHS computing device;
   an undiscoverable device that is included in the DC-MHS computing device; and
   a DataCenter System Control Module (DC-SCM) device that is included in the DC-MHS computing device and that is coupled to the operational system and the discoverable device, wherein the DC-SCM device is configured to:
      receive and store static undiscoverable device operation information for the undiscoverable device;
      retrieve, during initialization operations for the DC-MHS computing device, static discoverable device operational information for the discoverable device, and the static undiscoverable device operation information;
      configure, during the initialization operations for the DC-MHS computing device using the static discoverable device operational information and the static undiscoverable device operation information, operation of the operational system;
      retrieve, during runtime operations for the DC-MHS computing device, dynamic discoverable device operational information from the discoverable device, and the static undiscoverable device operation information; and
      modify, during the runtime operations for the DC-MHS computing device using the dynamic discoverable device operational information and the static undiscoverable device operation information, operation of the operational system.

2. The system of claim 1, wherein the operational system includes a power subsystem that is configured to operate to power the discoverable device and the undiscoverable device.

3. The system of claim 1, wherein the operational system includes a cooling subsystem that is configured to operate to cool the discoverable device and the undiscoverable device.

4. The system of claim 1, wherein the undiscoverable device includes an Add-In Card (AIC) device.

5. The system of claim 1, wherein the DC-SCM device is configured to receive the static undiscoverable device operation information for the undiscoverable device via a network from a DC-SCM configuration system.

6. The system of claim 1, wherein the DC-SCM device is configured to store the static undiscoverable device operation information for the undiscoverable device in a storage device that is included on a motherboard in the DC-MHS computing device and that stores the static discoverable device operational information.

7. An Information Handling System (IHS), comprising:
   a processing system; and
   a memory system that is coupled to the processing system and that includes instructions that, when executed by the processing system, cause the processing system to provide a DataCenter System Control Module (DC-SCM) engine that is configured to:
      receive and store static undiscoverable device operation information for an undiscoverable device that is included in the IHS with the processing system;

retrieve, during initialization operations for the IHS, static discoverable device operational information for a discoverable device that is coupled to the processing system, and the static undiscoverable device operation information;

configure, during the initialization operations for the IHS using the static discoverable device operational information and the static undiscoverable device operation information, operation of an operational system that is coupled to the processing system;

retrieve, during runtime operations for the IHS, dynamic discoverable device operational information from the discoverable device, and the static undiscoverable device operation information; and modify, during the runtime operations for the IHS using the dynamic discoverable device operational information and the static undiscoverable device operation information, operation of the operational system.

8. The IHS of claim 7, wherein the operational system includes a power subsystem that is configured to operate to power the discoverable device and the undiscoverable device.

9. The IHS of claim 7, wherein the operational system includes a cooling subsystem that is configured to operate to cool the discoverable device and the undiscoverable device.

10. The IHS of claim 7, wherein the undiscoverable device includes an Add-In Card (AIC) device.

11. The IHS of claim 7, wherein the DC-SCM engine is configured to receive the static undiscoverable device operation information for the undiscoverable device via a network from a DC-SCM configuration system.

12. The IHS of claim 7, wherein the DC-SCM engine is configured to store the static undiscoverable device operation information for the undiscoverable device in a storage device that is included on a motherboard in the IHS and that stores the static discoverable device operational information.

13. The IHS of claim 7, wherein the static undiscoverable device operation information includes a maximum operating power consumption, an average operating power consumption, a maximum operating temperature, and an average operating temperature of the undiscoverable device.

14. A method for configuring a DataCenter System Control Module (DC-SCM) device to operate with undiscoverable devices, comprising:

receiving and storing, by a DataCenter System Control Module (DC-SCM) device, static undiscoverable device operation information for an undiscoverable device that is included in a DataCenter Modular Hardware System (DC-MHS) computing device with the DC-SCM device;

retrieving, by the DC-SCM device during initialization operations for the DC-MHS computing device, static discoverable device operational information for a discoverable device that is coupled to the DC-SCM device, and the static undiscoverable device operation information;

configuring, by the DC-SCM device during the initialization operations for the DC-MHS computing device using the static discoverable device operational information and the static undiscoverable device operation information, operation of an operational system that is coupled to the DC-SCM device;

retrieving, by the DC-SCM device during runtime operations for the DC-MHS computing device, dynamic discoverable device operational information from the discoverable device, and the static undiscoverable device operation information; and modifying, by the DC-SCM device during the runtime operations for the DC-MHS computing device using the dynamic discoverable device operational information and the static undiscoverable device operation information, operation of the operational system.

15. The method of claim 14, wherein the operational system includes a power subsystem that is configured to operate to power the discoverable device and the undiscoverable device.

16. The method of claim 14, wherein the operational system includes a cooling subsystem that is configured to operate to cool the discoverable device and the undiscoverable device.

17. The method of claim 14, wherein the undiscoverable device includes an Add-In Card (AIC) device.

18. The method of claim 14, wherein the DC-SCM device receives the static undiscoverable device operation information for the undiscoverable device via a network from a DC-SCM configuration system.

19. The method of claim 14, wherein the DC-SCM device stores the static undiscoverable device operation information for the undiscoverable device in a storage device that is included on a motherboard in the DC-MHS computing device and that stores the static discoverable device operational information.

20. The method of claim 14, wherein the static undiscoverable device operation information includes a maximum operating power consumption, an average operating power consumption, a maximum operating temperature, and an average operating temperature of the undiscoverable device.

* * * * *